(12) United States Patent
da Silva Pratas Gabriel et al.

(10) Patent No.: US 11,025,919 B2
(45) Date of Patent: Jun. 1, 2021

(54) CLIENT-BASED ADAPTIVE STREAMING OF NONLINEAR MEDIA

(71) Applicants: Koninklijke KPN N.V., Rotterdam (NL); Nederlandse Organisatie voor Toegepast—Natuurwetenschappelijk Onderzoek TNO, The Hague (NL)

(72) Inventors: Alexandre da Silva Pratas Gabriel, The Hague (NL); Emmanuel Didier Remi Thomas, Delft (NL)

(73) Assignee: Koninklijke KPN N.V., Rotterdam (NL)

( * ) Notice: Subject to any disclaimer, the term of this patent is extended or adjusted under 35 U.S.C. 154(b) by 0 days.

(21) Appl. No.: 16/139,694

(22) Filed: Sep. 24, 2018

(65) Prior Publication Data

US 2019/0104316 A1 Apr. 4, 2019

(30) Foreign Application Priority Data

Oct. 3, 2017 (EP) .................................... 17194555

(51) Int. Cl.
*H04N 19/167* (2014.01)
*H04N 21/2343* (2011.01)
(Continued)

(52) U.S. Cl.
CPC .......... *H04N 19/167* (2014.11); *G06F 16/78* (2019.01); *H04L 65/602* (2013.01);
(Continued)

(58) Field of Classification Search
CPC ................. H04N 19/167; H04N 19/70; H04N 21/234345; H04N 21/4728
See application file for complete search history.

(56) References Cited

U.S. PATENT DOCUMENTS

2011/0125919 A1* 5/2011 Kwon ................. H04L 65/4084
709/231
2015/0016543 A1* 1/2015 Rapaka ................ H04N 19/105
375/240.25
(Continued)

FOREIGN PATENT DOCUMENTS

WO 2017202899 A1 11/2017

OTHER PUBLICATIONS

European Search Report, European Patent Application No. 17194555.3, dated Dec. 8, 2017, 8 pages.
(Continued)

*Primary Examiner* — Robert J Hance
(74) *Attorney, Agent, or Firm* — McDonnell Boehnen Hulbert & Berghoff LLP

(57) ABSTRACT

A method for adaptive streaming of nonlinear video is described wherein the method comprises receiving a manifest file comprising metadata defining a playback period defining video data of a predetermined playback duration, a playback period including at least one adaptation set defining a plurality of representations, each representation defining a set of segment identifiers, each segment identifier identifying a segment comprising a sequence of video frames; the metadata further comprising spatial playback information including at least a first region descriptor associated with a first adaptation set of a first playback period, the first region descriptor defining a destination identifier and a first region in video frames of the first adaptation set, the destination identifier signaling the client apparatus that the first region is linked to a second adaptation set; the client apparatus using the metadata to playback video data of the first adaptation set by requesting one or more network nodes to transmit segments of the first adaptation set; and, receiving or determining, during playback of requested segments, information associated with at least a second region in the
(Continued)

video frames of the first adaptation set, the second region defining a region of interest (ROI) of a user of the client apparatus; the client apparatus selecting the second adaptation set for playback after the end of the playback of the first adaptation set on the basis of the first and second region, the selecting being based on a distance or an overlap between the first and second region.

21 Claims, 13 Drawing Sheets

(51) Int. Cl.
| | |
|---|---|
| H04N 19/162 | (2014.01) |
| H04N 21/854 | (2011.01) |
| H04L 29/06 | (2006.01) |
| H04N 21/845 | (2011.01) |
| G06F 16/78 | (2019.01) |
| H04N 21/4728 | (2011.01) |
| H04N 21/6587 | (2011.01) |

(52) U.S. Cl.
CPC ... *H04N 19/162* (2014.11); *H04N 21/234345* (2013.01); *H04N 21/4728* (2013.01); *H04N 21/6587* (2013.01); *H04N 21/8455* (2013.01); *H04N 21/85406* (2013.01)

(56) References Cited

U.S. PATENT DOCUMENTS

| | | | | |
|---|---|---|---|---|
| 2015/0026358 | A1* | 1/2015 | Zhang | H04N 9/8205 709/231 |
| 2015/0120819 | A1 | 4/2015 | Zhang et al. | |
| 2017/0053675 | A1 | 2/2017 | Dickerson et al. | |
| 2017/0118540 | A1* | 4/2017 | Thomas | H04N 19/167 |
| 2017/0155912 | A1* | 6/2017 | Thomas | H04L 67/02 |
| 2017/0347026 | A1* | 11/2017 | Hannuksela | H04N 21/26258 |
| 2018/0077210 | A1* | 3/2018 | Hannuksela | H04N 21/47217 |
| 2018/0103199 | A1* | 4/2018 | Hendry | H04N 21/2343 |
| 2019/0141311 | A1* | 5/2019 | Lee | H04N 19/597 |

OTHER PUBLICATIONS

Krishnamoorthi, Vengatanathan et al., "Empowering the Creative User: Personalized HTTP-Based Adaptive Streaming of Multi-Path Nonlinear Video", ACM SIGCOMM Computer Communication Review, vol. 43, No. 4, pp. 53-58. ACM, 2013.

International Standard, Information technology—Dynamic adaptive streaming over HTTP (DASH)—Part 1: Media presentation description and segment formats, ISO/IEC 23009-1, Third Edition Aug. 2019.

D'Acunto et al., MPD signalling of 360 content properties for VR applications, ISO/IEC JTC1/SC29/WG11 MPEG2016/m38605, May 2016.

Begen et al., Metrics and SAND Messages for DASH-VR, ISO/IEC JTC1/SC29/WG11 MPEG 118/m40333, Apr. 2017.

International Standard, Information technology—Dynamic adaptive streaming over HTTP (DASH)—Part 5: Server and network assisted DASH (SAND), ISO/IEC 23009-5, First edition Feb. 2017.

Information technology—MPEG systems technologies—Part 10: Carnage of Timed Metadata Metrics of Media in ISO Base Media File Fonmat.

International Standard, Information technology—Coded representation of immersive media—Part 2: Omnidirectional media format ISO/IEC 23090-2, First edition Jan. 2019.

The International Search Report with Written Opinion for PCT/EP2018/083926 dated Jan. 22 29, 16 pages.

European Search Report for European Application No. 17205979.2 dated Mar. 29, 2018, 12 pages.

* cited by examiner

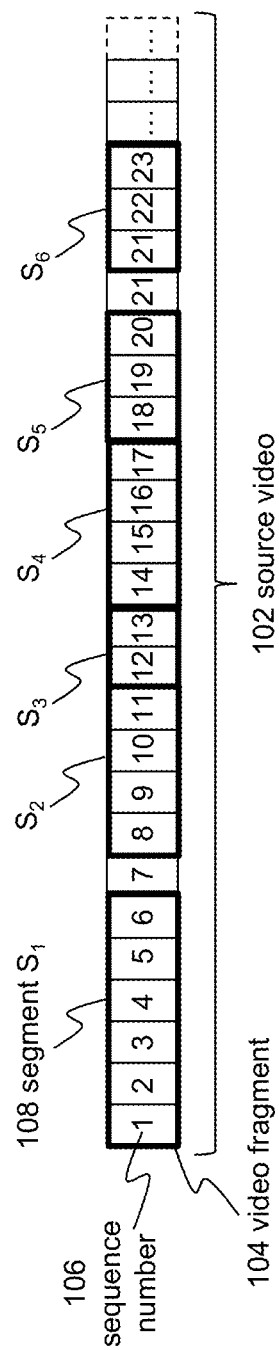
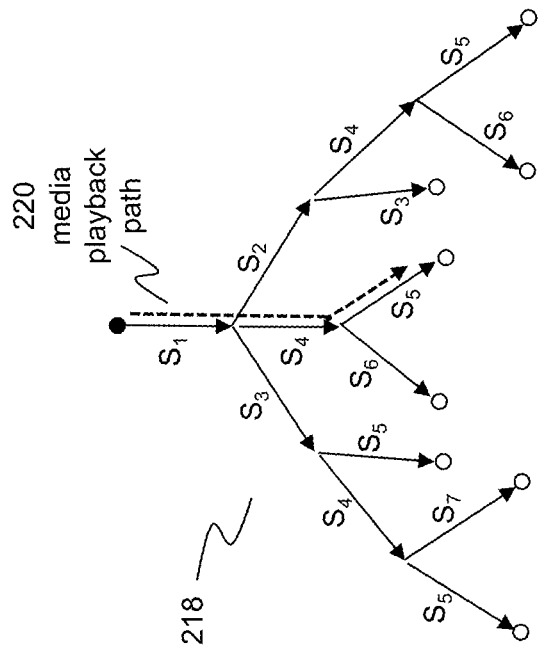
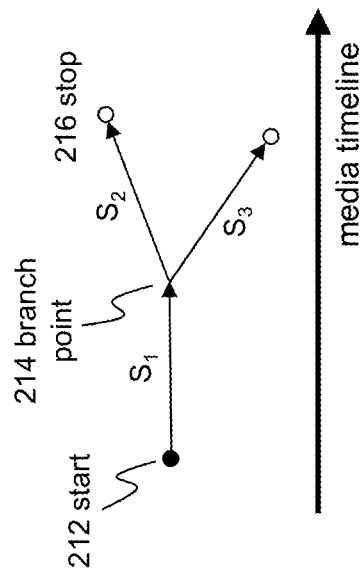
FIG. 1
FIG. 2B
FIG. 2A

CLIENT-BASED ADAPTIVE STREAMING OF NONLINEAR MEDIA

CROSS REFERENCE TO RELATED APPLICATIONS

The present application claims priority to European Patent Application EP17194555.3, which was filed in the European Patent Office on Oct. 3, 2017, and which is hereby incorporated in its entirety herein by reference.

FIELD OF THE INVENTION

The invention relates to adaptive streaming of nonlinear media, including nonlinear omnidirectional video, and, in particular, though not exclusively, to methods and systems for client-based adaptive streaming of nonlinear media, a client apparatus and server apparatus for client-based adaptive streaming of nonlinear media, data structures enabling client-based adaptive streaming of nonlinear video and a computer program product using such methods.

BACKGROUND OF THE INVENTION

Advances in both camera and image processing technologies not only enable recording in ever higher resolutions, but also stitching the output of multiple cameras together. This way a set of cameras can together record in panorama and/or omnidirectional format at resolutions higher than 8K×4K. Video representations including video projected on a curved surface, such as omnidirectional video or 360-degree video (which may be referred to as spherical video) or more specific video representations such as cylindrical video. These new video representations enable new user experiences such as virtual reality (VR), augmented reality (AR) and mixed reality, which are currently gaining momentum in the industry. Streaming high-quality non-planar video content however still poses challenges including the high-bandwidth requirements that are needed and formats that are suitable for representing spherical content in a bitstream.

With the rising popularity of these new video representations, new applications are developed for further increasing the immersiveness of the user experience. One of these new applications is so-called interactive 360 video applications, which sometimes is referred to as playback of nonlinear video. US2017/0053675 describes a content creation system that is adapted to create an interactive 360-degree video file, which contains a plurality of linked 360-degree video clips. A content creator system enables insertion of a link in a first 360 video clip to a second 360 video clip. The link may have the form of a so-called "hotspot", typically indicator in the form of a graphical overlay over the video, which can be activated by a user. This way, the content may be played back by activating hotspots using a cursor which follows the viewing direction, i.e. the viewpoint, of the user wearing a HMD. The content creator system thus links 360 video clips using hotspots and creates one interactive 360 video file by transcoding the linked clips a single interactive 360 video file. This way, the 360 video content can be played back via different playback paths.

A problem related to the referenced content creator system is that it does not generate content that can be distributed in a scalable manner and that is compatible with state-of-the-art streaming protocols (including e.g. HTTP adaptive streaming protocols like MPEG DASH and HLS) and content distribution systems such as content distribution networks (CDNs). Such features are indispensable for large-scale content delivery. A CDN is optimized for efficient content streaming wherein different parts of the content file (e.g. popular and non-popular content, advertisement content, frequently used tile streams, etc.) are stored and/or cached in a distributed way, i.e. at different locations in the network. A further problem relating to the content creator system is that the technology is not very flexible in terms of authoring. Once the video file is created, the links and the content (the video clips) are fixed. The technology does not allow flexible authoring and dynamic introduction of new linked pieces of 360 video and/or the removal of links to existing 360 video during playback. The absence of such functionality is especially disadvantageous in the context of personalized content, e.g. targeted advertisements, which requires dynamic insertion of media during playback.

The article by Krishnamoorthi et al., "Empowering the creative user: personal HTTP-based adaptive streaming of multi-path nonlinear video", pp. 53-58, describes an adaptive streaming scheme that is capable of playback of a type of nonlinear media. The streaming process is based on Adobe's HTTP Dynamic Streaming (HDS) protocol, wherein a source video is divided in a sequence of so-called video fragments (i.e. video files of a short duration, which in other standards may be referred to as chunks or (media) segments). Each video fragment has a sequence number wherein sequence numbers of subsequent video fragments are monotonically increasing with the playback timeline. Sequence of video fragments representing the source video may be logically formatted in so-called HDS segments, i.e. sequences of video fragments wherein each video fragment may only be part of one segment.

Metadata describing the video fragments and associated HDS segments is stored a manifest file and a HDS client device uses the manifest file to retrieve and playback video fragments in HDS segments in accordance with their sequence numbers. The authors of the article extended HDS client device with a download manager that is adapted to receive a further metadata file defining different sequences of HDS segments, wherein each sequence of HDS segments defines a playback path through the sequentially ordered video fragments. The different playback paths through the sequence of HDS segments can be represented in a tree structure including branches wherein at a branch the HDS client can select between different HDS segments on the basis of certain rules.

A problem related to the above-referenced adaptive streaming scheme is that it has only limited flexibility in authoring, amending and personalizing playback paths. Due to the fact that video fragments are addressed on the basis of sequence numbers, the scheme does not allow repetitive playback of one or more HDS segments that have already played back earlier in the playback path. This provides a substantial limitation in the way video can be played back, especially when dealing with spherical video. The above-referenced adaptive streaming scheme also does not provide a scheme wherein an author can flexible insert different alternative segments in an already existing playback scheme. A further problem is that is does not provide a scheme for adaptively streaming of nonlinear spherical video.

Hence, from the above it follows that there is a need in the art for improved methods and systems for adaptive streaming of nonlinear media. In particular, there is a need in the art for methods and systems for adaptive streaming of nonlinear media are compatible with state-of-the are content delivery networks. Moreover, there is a need in the art for methods and systems for adaptive streaming of nonlinear media that allow flexible generation of nonlinear media, e.g. video and audio data, wherein, during streaming, a client device may select from different media paths wherein each media path may be associated with a different media experience.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by, or in connection with, an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the invention to reduce or eliminate at least one of the drawbacks known in the prior art. It is an aim of the invention described in this disclosure is to allow a content creator to create different media experiences based on the way a user interacts with the video, e.g. the viewing behaviour of the user and/or panning or zooming actions of the user. Media that different media experiences depending on the way a user interacts with the media may be referred to as nonlinear media, wherein nonlinear media may include nonlinear video and/or audio.

In an aspect, the invention may relate to a method for adaptive streaming of nonlinear media. In an embodiment, the method comprises a client apparatus, e.g. an HTTP adaptive streaming (HAS) client apparatus, receiving a first manifest file comprising metadata defining one or more playback periods, a playback period defining video data of a predetermined playback duration, a playback period including at least one adaptation set defining a plurality of representations, each representation defining a set of segment identifiers, each segment identifier identifying a segment comprising video data, the video data including a sequence of video frames; the metadata further comprising spatial playback information including at least a first region descriptor associated with a first adaptation set of a first playback period, the first region descriptor defining a destination identifier and a first region in video frames of the first adaptation set, the destination identifier signaling the client apparatus that the first region is linked to a second adaptation set, preferably the second adaptation set being associated with a second region descriptor, the second region descriptor including a source identifier that matches the destination identifier; the client apparatus using the metadata to playback video data of the first adaptation set by requesting one or more network nodes to transmit segments of the first adaptation set; and, receiving or determining, during playback of requested segments, information associated with at least a second region in the video frames of the first adaptation set, the second region defining a region of interest (ROI) of a user of the client apparatus; and, the client apparatus selecting the second adaptation set for playback after the end of the playback of the first adaptation set on the basis of the first and second region, the selecting being based on a distance or an overlap between the first and second region.

Hence, the invention allows playback of nonlinear media, i.e. media defining different media playback paths wherein a playback path may be selected on the basis of information associated with the way a user interacts with the media during playback, e.g. a user looking in a particular viewing direction at a particular time instance.

The different media playback paths may be defined by spatial playback information, in particular spatial playback region descriptors, in the manifest file, which link a region in video frames (in a representation) belonging to the first adaptation set, to a further adaptation set. If the client apparatus determines that a user interacts with the playback region in a particular way (e.g. a viewpoint or viewport of a user watching 360 video using an head-mounted device (HMD) or the like coincides or at least partially overlaps with a playback region), the client apparatus may select the further adaptation set as the next playback period that is going to be played back after the end of the playback of the video of the current adaptation set.

The invention thus allows streaming of nonlinear (interactive) media wherein the media, the sets of segments of the adaptation sets of the different playback periods, may be stored in the network in a distributed way i.e. at different network nodes (media servers and/or caches) of a CDN. Further, the authoring of the nonlinear media can be simply done by linking adaptation sets on the basis of the spatial playback information, which in an embodiment may be inserted (at least partly) in the manifest file. The sequence in which segments should be played back by a client is only fixed within an adaptation set. The author is therefore not limited in the way the adaptation sets may be linked during authoring. Hence, a media playback path may include playback of the same adaptation set multiple times.

In an embodiment, the first region descriptor further comprises a period identifier, the period identifier signaling the client apparatus that the second adaptation set is defined in the metadata of a second playback period.

In an embodiment, the spatial playback information may be configured to link adaptation sets of playback periods into sequences of logically ordered adaptation sets, wherein each sequence forms a media playback path.

In a further embodiment, the first region descriptor further includes location information of the first region and, optionally, information associated with the dimensions and/or shape of the first region, preferably the location information including coordinates of the first region in the video frames of the first adaptation set or information to determine coordinates of the first region in the video frames of the first adaptation set. In these embodiments, the region descriptor may comprise further information for defining the location and shape of the region. The location of the region may be defined on the basis of a suitable coordinate system, e.g. a 2D Cartesian coordinate system or a spherical coordinate system (e.g. in case of spherical video data).

In an embodiment, the spatial playback information may further include a dynamic region parameter, the dynamic region parameter signaling the client apparatus that the location of the first region changes as a function of time. In an embodiment, the coordinates associated with the location of the dynamic region may be stored as metadata of the video data of the first playback period. In this embodiment, the region defined by the region descriptor may be a moving region (a dynamic region) in the video frames of the media segments of the first adaptation set. The coordinates of the moving region may be stored as metadata (e.g. a metadata track) along with the video data (e.g. one or more video tracks).

In an embodiment, the first adaptation set may be associated with a plurality of region descriptors defining locations of a plurality of regions in the video frames of the first adaptation set, each of the region descriptors signaling the client apparatus that each of the plurality of regions is linked to a further adaptation set, the client apparatus selecting the second adaptation set on the basis of the locations of the plurality of regions and the location of the region of interest (ROI) of the user of the client apparatus.

In an embodiment, the first manifest file may further comprise metadata defining the second adaptation set. In an embodiment, the method may further comprise: the client apparatus requesting one or more network nodes to transmit media segments of the second adaptation set. In this embodiment, at least part of the linked adaptation sets are described in a single manifest file.

In an embodiment, the spatial playback information may further include a manifest file reference identifier or information for determining the manifest file reference identifier, the manifest file reference identifier including information of a location of a network node, preferably a URL, the manifest file reference identifier signaling the client apparatus to request the network node to transmit metadata of the second adaptation to the client device, preferably the manifest file reference identifier defining a MPD chaining element associated with the second adaptation set.

In an embodiment the method may further comprise: the client apparatus using the manifest file reference identifier to request a network node to transmit a second manifest file comprising media segment identifiers or information for determining media segment identifiers associated with the second adaptation set; and, the client apparatus using the second manifest file to request a network node to transmit segments of the second adaptation set. In this embodiment, the metadata defining the second adaptation set will be sent in a further manifest file or a manifest file update to the client apparatus.

In an embodiment, the adaptive streaming may be based on an HTTP adaptive streaming protocol, preferably the protocol being one of: MPEG Dynamic Adaptive Streaming over HTTP (MPEG DASH), 3GPP DASH or MPEG Common Media Application Format (CMAF).

In an embodiment, a playback period may be defined as a Period as defined in the MPEG DASH standard or a CMAF Presentation as defined in the CMAF standard. In an embodiment, an adaptation set may be defined as an Adaptation Sets according to the MPEG DASH standard or an CMAF Switching Set according to the CMAF standard, In an embodiment, a representation may be defined as a Representation according to the MPEG DASH standard or a CMAF Track according to the CMAF standard. Further, a segment may be defined as a Media Segment according to the MPEG DASH standard or a CMAF fragment according to the CMAF standard.

In an embodiment, wherein the video data include spherical video data, the spherical video data defining pixels on a curved surface.

In an embodiment, the region of interest may include a viewing direction of a user viewing the video playback of the spherical video data.

In an embodiment, the region of interest and the first region may be defined on the basis of spherical coordinate system.

In a further aspect, the invention relates to a client apparatus comprising a computer readable storage medium having computer readable program code embodied therewith, and a processor, preferably a microprocessor, coupled to the computer readable storage medium, wherein responsive to executing the first computer readable program code, wherein the processor may be configured to perform executable operations comprising: receiving a first manifest file comprising metadata defining one or more playback periods, a playback period defining video data of a predetermined playback duration, a playback period including at least one adaptation set defining a plurality of representations, each representation defining a set of segment identifiers, each segment identifier identifying a segment comprising video data, the video data including a sequence of video frames; the metadata further comprising spatial playback information including at least a first region descriptor associated with a first adaptation set of a first playback period, the first region descriptor defining a destination identifier and a first region in video frames of the first adaptation set, the destination identifier signaling the client apparatus that the first region is linked to a second adaptation set, preferably the second adaptation set being associated with a second region descriptor, the second region descriptor including a source identifier that matches the destination identifier; using the metadata to playback video data of the first adaptation set by requesting one or more network nodes to transmit segments of the first adaptation set; and, receiving or determining, during playback of requested segments, at least a second region in the video frames of the first adaptation set, the second region defining a region of interest (ROI) of a user of the client apparatus; and, selecting the second adaptation set for playback after the end of the playback of the first adaptation set on the basis of the first and second region, the selecting being based on a distance or an overlap between the first and second region.

In yet a further aspect, the invention relates to a non-transitory computer-readable storage media comprising a manifest file for a client apparatus, preferably an HTTP adaptive streaming, HAS, client apparatus, the manifest file comprising computer readable program code, the code comprising: metadata defining one or more playback periods, a playback period defining video data of a predetermined playback duration, a playback period including at least one adaptation set defining a plurality of representations, each representation defining a set of segment identifiers, each segment identifier identifying a segment comprising video data, the video data including a sequence of video frames; the metadata further comprising spatial playback information including at least a first region descriptor associated with a first adaptation set of a first playback period, the first region descriptor defining a destination identifier and a first region in video frames of the first adaptation set, the destination identifier signaling the client apparatus that the first region is linked to a second adaptation set, preferably the second adaptation set being associated with a second region descriptor, the second region descriptor including a source identifier that matches the destination identifier; the metadata enabling a client apparatus to playback video data of the first adaptation set by requesting one or more network nodes to transmit segments of the first adaptation set; and, to select the second adaptation set for playback after the end of the playback of the first adaptation set on the basis of the first and second region, the selecting being based on a distance or an overlap between the first region and a second region in the video frames of the first adaptation set, the second region defining a region of interest (ROI) of a user of the client apparatus and being received or determined during playback of requested segments.

The invention may also relate to a program product comprising software code portions configured for, when run in the memory of a computer, executing any of the method steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 1 depicts a data model of a known adaptive streaming scheme for nonlinear media.

FIG. 2A depicts a graph illustrating different playback paths in a known adaptive streaming scheme for nonlinear media.

FIG. 2B is another depiction of a graph illustrating different playback paths in a known adaptive streaming scheme for nonlinear media.

DETAILED DESCRIPTION

Figure 3:
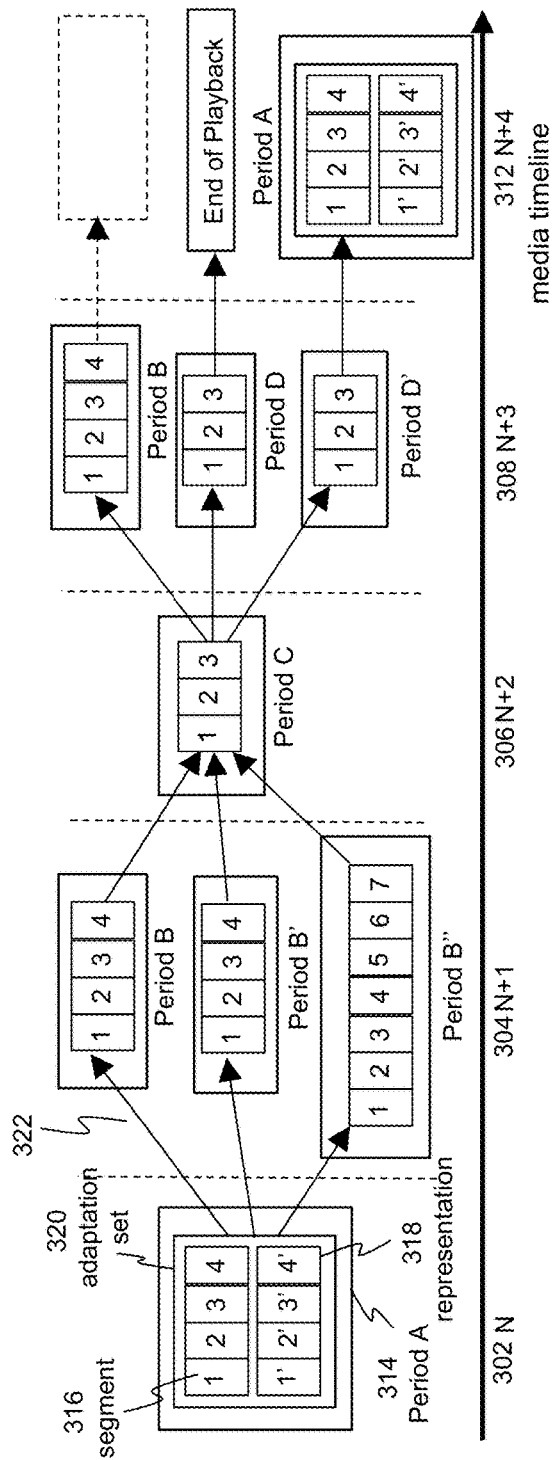
FIG. 3 depicts a schematic of an adaptive streaming process for nonlinear media according to an embodiment of the invention.

It is an aim of the embodiments in this disclosure to provide a HTTP adaptive streaming (HAS) and authoring scheme for nonlinear media. The embodiments in this disclosure allow streaming of segmented nonlinear media, including advanced video formats, such as ultra-high definition panorama video, spherical video (e.g. omnidirectional or 360 video) or other types of video formats (e.g. cylindrical video or the like). While the exemplary implementations of the invention are described on the basis of an HTTP adaptive streaming (HAS) protocol referred to as MPEG DASH, implementations in other types of streaming protocols for delivery of segmented media such as 3GPP DASH and MPEG Common Media Application Format (CMAF), are also foreseen.

Adaptive streaming schemes for delivery of segmented nonlinear media are known in the prior art. For example, Krishnamoorthi et al. described in their article "Empowering the creative user: personal HTTP-based adaptive streaming of multi-path nonlinear video", pp. 53-58, an adaptive streaming scheme that is capable of playback of a type of nonlinear media. Part of this known scheme is schematically depicted in FIGS. 1 and 2. The streaming process is based on Adobe's HTTP Dynamic Streaming (HDS) protocol, which used as data model that is shown in FIG. 1. A linear source video 102 is divided in a sequence of so-called video fragments 104 (i.e. video files of a short duration, which in other standards may be referred to as chunks or (media) segments). Each video fragment may be stored in different qualities so that during streaming a client device can decide on the basis of the available bandwidth so switch from one video quality to another video quality. This way, the client device is able to adapt its streaming behaviour in response to changing network conditions.

Each video fragment has a sequence number 106 wherein sequence numbers of subsequent video fragments are monotonically increasing with the playback timeline. Sequence of video fragments representing the source video may be logically formatted in so-called HDS segments 108. A HDS segments defines a set of video fragments wherein the video frames are arranged according to their sequence numbers. Each video fragment may only be part of one segment.

Metadata describing the video fragments and associated HDS segments is stored in a manifest file and a HDS client device uses the manifest file to retrieve and playback video fragments in HDS segments in accordance with their sequence numbers. The retrieval of the video fragments includes the HDS client device sending HTTP requests to a server for requesting transmission of video fragments of different sequence numbers to the client device.

The authors of the article extended a HDS client device with a download manager that is adapted to receive a further metadata file defining different sequences of HDS segments, wherein each sequence of HDS segments defines a playback path through the sequentially ordered video fragments. This is schematically depicted in FIGS. 2A and 2B. As shown in FIG. 2A, the metadata file may define that video playback may be started on the basis of video fragments of segment S1. After playback of segment S1, the metadata in the metadata file may define that the end of segment S1 is associated with a branch point 214 wherein—depending on some rules—either video fragments of segment S2 or video fragments of segment S3 may be played back. The branch point thus defines two different playback paths. This way, the metadata file may define multiple sequences of HDS segments defining multiple playback paths. The structure of the different playback paths 220 can be represented in a tree structure 218 including branches wherein at a branch the HDS client can select between different HDS segments on the basis of certain rules.

A problem related to the above-referenced adaptive streaming scheme is that it has only limited flexibility in authoring, amending and personalizing playback paths. As shown in FIG. 2B, each playback path 220 is formed by a sequence of segments wherein the video fragments are ordered on the basis ascending sequence number. Due to the fact that video fragments are addressed on the basis of sequence numbers, the scheme only allows selection and playback of segments that include video fragments that have a sequence number that is higher than the sequence numbers of the video fragments that have already been played back. In other words, the scheme does not allow repetitive playback of one or more HDS segments that have already played back earlier in the playback path.

This provides a substantial limitation in the way video can be played back, especially when dealing with spherical video—a user may want to return and experiment another viewing direction for example. The above-referenced adaptive streaming scheme also does not provide a scheme wherein an author can flexible insert different alternative segments in an already existing playback scheme.

FIG. 3 depicts a schematic of an adaptive streaming process for nonlinear media according to an embodiment of the invention. In particular, FIG. 3 depicts an adaptive streaming process of nonlinear media which uses a data format that is compatible with the MPEG DASH standard. In this scheme, media data (audio and video data) are defined as a plurality of playback periods 302-312, wherein each playback period may define one or more pieces of content of a predetermined length and a predetermined starting time. As shown in FIG. 3, a playback period, e.g. playback period A 314, may contain media data in the form of set of temporally ordered, short media files which in MPEG DASH are referred to as media segments 316. A sequence of segments comprising media of a predetermined quality may also be referred to as a representation 318. A playback period may be stored as a plurality of representations, wherein each representation represents media data of a different quality versions (e.g. differently encoded versions). The plurality of representations may be referred to as an adaptation set 320.

During playback of media data of a playback period, a client device may sequentially request the network to transmit segments of a predetermined representation. If the available bandwidth requires so, the client device may decide at one point to continue playback on the basis of segments of another representation (e.g. a lower video quality). The information about the structure of the media, including the playback periods, adaptation sets, representations and segments, may be stored in a so-called manifest file, which in MPEG DASH is referred to as a Media Presentation Description (MPD).

The manifest file may be provided to the client device, which may store it in its memory. During playback, the HAS client device may parse the manifest file and look for a first playback period that is defined as the start of the media playback. During playback of the media segments of an adaptation set of a current playback period, the HAS client will look for the next playback period that needs to be played back after the end of the playback of the current playback period. In a conventional manifest file, an e.g. MPD, conventional Periods defining Adaptation Sets are listed in a sequential order and the HAS client will simply playback the media in the order the Periods are listed in the manifest file.

In contrast, in the present invention, the playback order of the adaptation sets of the different playback periods in the MPD is controlled by so-called spatial playback information, which includes information that links a region of interest (ROI) in the video of a first adaptation set of a first playback period to a region of interest in the video a second adaptation set of a second playback period. Such region of interest may be referred as a spatial playback region or—in short—a region.

As shown in FIG. 3, during playback, the HAS client may select video data of adaption sets of playback periods and put these selected adaptation sets sequentially on the media playback timeline. For example, the HAS client may put an adaption set of playback period A 302 as a first Period N on the media timeline for playback. During playback, the HAS client may parse the MPD and determine on the basis of spatial playback information 322 in the MPD that three adaptation sets of three different Playback Periods B, B',B" 304 in the MPD are available to be played back as the next Period N+1 on the media timeline. In particular, on the basis of the spatial playback information in the MPD, the HAS client device may determine that each of three regions in video frames associated with an adaptation set of playback period A are linked to a region of an adaptation set of one of the three different Playback Periods B, B', B" and that on the basis of certain user information, e.g. user interaction information, one of these adaption sets may be played back once the media playback of the adaptation set of Period A is finished.

One or more regions defined in video frames associated with the first adaptation set and the linkage of each of these regions to a further adaptation set (e.g. the adaptation sets associated with playback periods B, B' and B" as depicted in FIG. 3) enable a HAS client to select an adaptation set on the basis of certain user information, e.g. certain user interaction, and to put the selected adaptation set as the next playback period on the media timeline for playback.

These spatial playback regions in the video frames associated with an adaptation set may be defined as metadata in the MPD and all information elements in the MPD that control the playback of the adaptation sets on the basis of spatial playback regions may be referred to as spatial playback information. The spatial playback information may define one or more spatial playback region descriptors associated with an adaptation set for defining one or more regions in a video data (vide frames or video pictures) associated with the adaptation set and for linking each region to a further adaptation set that is associated with a spatial playback region. Such spatial playback region descriptor may be hereafter be referred to as a region descriptor. The region descriptor and its use in playback of nonlinear media in a HAS streaming scheme will be described hereunder in greater detail.

Hence, the HAS client may select an adaptation set of a next playback period from a plurality of playback periods that may be linked to different spatial playback regions in content of a playback period the HAS client is currently playing. The selection of the next playback period by the HAS client on the basis of the metadata in the MPD and on the basis of user information may be implemented in different ways.

For example, in an embodiment, the HAS client may receive information about the viewing behavior of the user. The viewing behavior may include e.g. coordinates associated with an area of video frames representing a scene a user is currently watching or interacting with. When a user is watching spherical video data the area the user is watching may be referred to as a viewport. The HAS client may select an adaptation set of a next playback period from the plurality of playback periods on the basis of the viewing behavior of the user. For example, when the viewport matches or at least partly coincides with a region for a certain time, the HAS client may select the adaptation set that is linked to the region.

Referring to FIG. 3, if, during playback of a current adaptation set, a HAS client device determines that the user is looking (for a predetermined period of time) at a certain predetermined area or in the direction of a certain spatial playback region in the video of the current adaptation set that is linked to a region of an adaptation set of Playback Period B', the HAS client device may select the adaptation set of this playback period as the next playback period and put this as Period N+1 304 on the media timeline. The metadata in the MPD may signal the HAS client device that a region in video frames associated with an adaptation set of playback period B' is linked to an adaptation set in playback period C. Hence, after playback of playback period B', the HAS client device may put playback period C as Period N+2 306 on the media timeline. Thereafter, during playback of the video data of playback period C, the HAS client device may select from a plurality of adaptation sets which are associated with different playback periods, i.e. Playback Period B, Playback Period D or Playback Period D'. Hence, in this situation, depending on the viewing behavior of the user, the HAS client may put Playback Period B again as Period N+3 308 on the media timeline.

The HAS media playback scheme depicted in FIG. 3 allows a HAS client device to playback video defined as a predetermined number of linked adaptation sets which may be from the same or different playback periods. Depending on the way the user interacts with the video, e.g. the viewing behavior of the user, the user may experience a different media experience.

Figure 4:
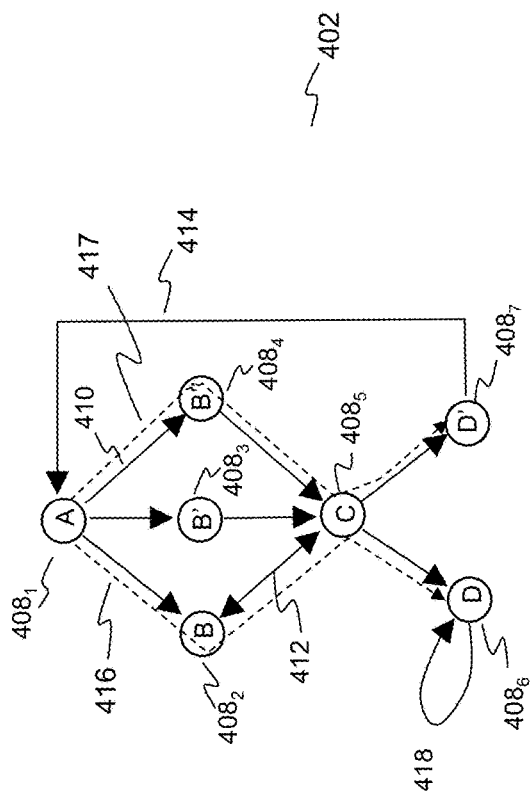
FIG. 4 depicts a graph illustrating different playback paths in an adaptive streaming scheme for nonlinear media according to an embodiment of the invention.

FIG. 4 depicts a graph illustrating different playback paths in an adaptive streaming scheme for nonlinear media according to an embodiment of the invention. Here, adaptation set of different playback periods may form a directed graph including vertices $408_{1-7}$ connected by directed edges 410-418, i.e. an edge associated with a direction. In this scheme, the vertices may represent adaptation sets in playback periods and the directed edges define how the adaptation sets in playback periods are linked to each other. As shown in FIG. 4, the directed edges may define different playback paths through the linked adaptation sets of playback regions. At least one vertex, e.g. vertex A $408_1$, may define the start of the playback path, and at least one vertex the end of the playback scheme. For example, a first playback path 416 may signal a HAS client device that adaptation sets of Playback Periods A, B, C and D may can be sequentially played back in order to provide a first media experience to a user. Similarly, a second playback path 417 may signal the HAS client device that adaptation sets of Playback Periods A, B'', C and D' may be sequentially played back in order to provide a second media experience to a user. Depending on the metadata, a media playback path may include the playback of an adaptation set multiple times, e.g. A, B, C D, D, D, . . . . As shown in FIG. 4, the invention allows construction of different types of playback paths, e.g. an edge may define a bidirectional path 412 between two vertices, an edge 414 may define a path that refers back to the start of a playback path and/or a self-loop, i.e. an edge 418 that connects a vertex with itself. Hence, in contrast to prior art adaptive streaming schemes for nonlinear playback, the invention allows authoring of nonlinear media that allows playback of (parts of) a media path multiple times. Such functionality is particular advantageous in playback schemes of spherical video, e.g. a guided tour through an area of a building in which the a user is allowed determine its own path through the media by interacting with the media.

Figure 5:
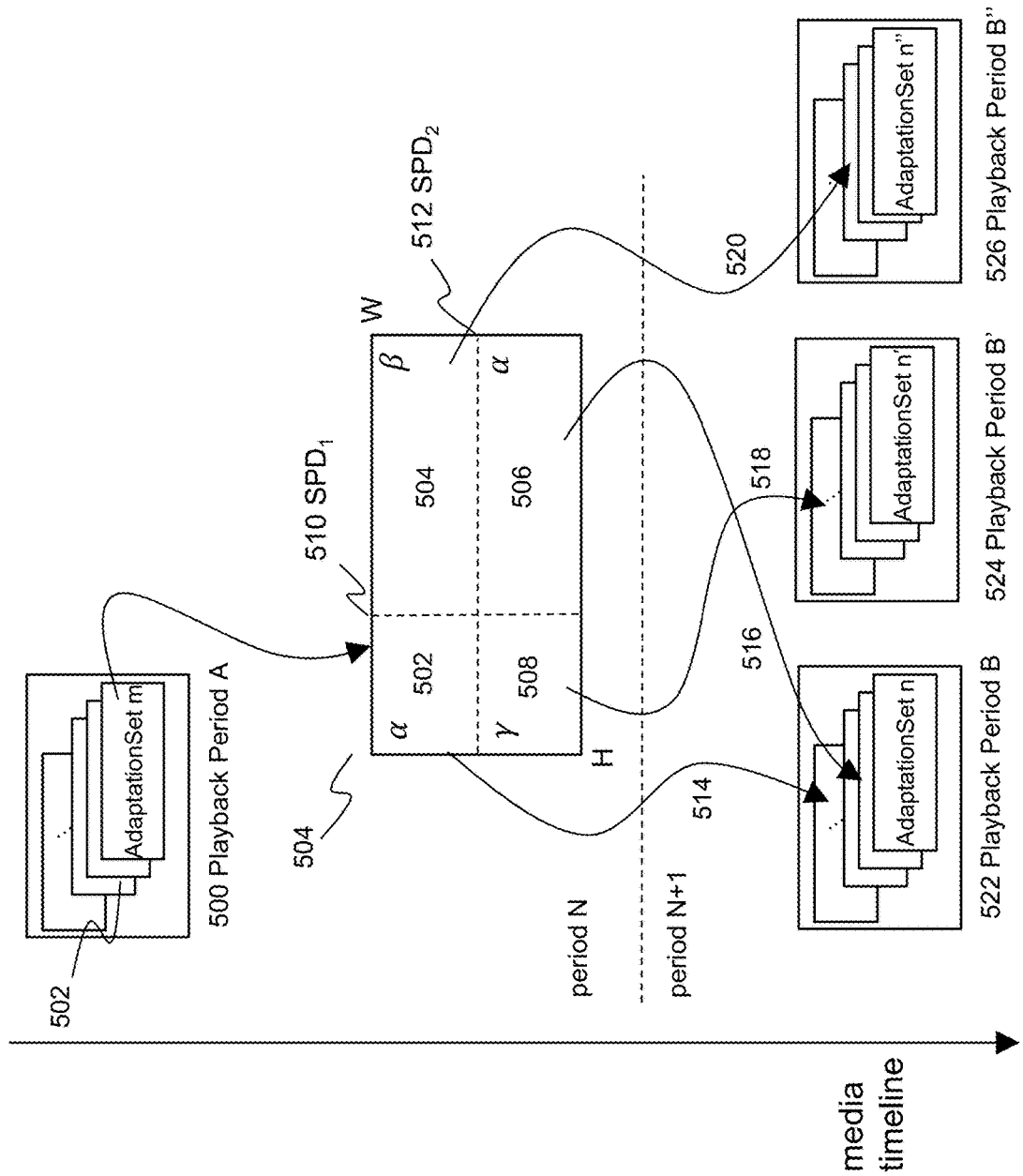
FIG. 5 depicts the use of spatial playback regions in an adaptive streaming process for nonlinear media according to an embodiment of the invention.

FIG. 5 depicts the use of spatial playback regions in an adaptive streaming process for nonlinear media according to an embodiment of the invention. In particular, FIG. 5 schematically depicts the playback of an adaptation set 502 of playback period A 500 as Period N on the media timeline.

During playback, the HAS client device uses the metadata in the manifest file to retrieve media segments associated with the first (current) adaptation set 502. These segments may include spherical video data which may be decoded by a video decoder into video frames 504 which will be rendered as spherical video using a suitable playback device. Spatial playback information in the manifest file may define spatial playback regions 502-508 which can be mapped onto the video frames of the first adaptation set. A spatial playback region (SPR) may define a region in a certain media space, e.g. a 2D media space in which content is represented in a 2D plane, e.g. in the form of pixels in a rectangular video frame, or a 3D media space in which content may be represented one a spherical plane, e.g. in the form of pixels on a sphere. A suitable coordinate system, e.g. a 2D Cartesian coordinate system or a 3D spherical coordinate system, may be used to define the location of the region in the media space.

The regions may be defined using one or more spatial playback dividers 510,512. A spatial playback divider may define a line dividing a video frame in different regions. In another embodiment, the regions may be defined on the basis of coordinates. Further, metadata in the MPD defining a spatial playback region may include references 514-520 to adaptation sets of playback periods which may be played out by the client device after the first adaptation set. The example in FIG. 5 depicts four regions 502-508 in video frames of the first adaptation set which are linked to adaptation sets of three different playback periods B,B',B'' 522-526 which signals the HAS client device that it may select one of these adaptation sets on the basis of a user interacting, with one or more of the regions.

The spatial playback information, such as information defining the spatial playback regions and the links to the adaptation sets, may be signalled to a HAS client using region descriptors in the manifest file. In an embodiment, a region descriptor may be defined as a predefined MPD element, e.g. a SpatialPlaybackRegion MPD element, in an MPD, which is associated with an adaption set. The region descriptor may define a position and dimensions of a region in video frames associated with an adaptation set using a suitable coordinate system including a conventional Cartesian coordinate system or a spherical coordinate system using spherical coordinates. The syntax for the spherical coordinate case is described hereunder in more detail.

Table 1 hereunder describes an example of a region descriptor according to an embodiment of the invention. In particular, table 1 describes a number of parameters associated with an MPEG DASH type region descriptor SpatialPlaybackRegion. The SpatialPlaybackRegion MPD element may comprise parameters for defining an area representing a spatial playback region.

TABLE 1

| Spatial Playback Region definition | |
| --- | --- |
| SpatialPlaybackRegion | Semantic of parameters |
| id | Identifier of the current SPR |
| width | Width of the area in a rectangular region |
| height | Height of the area in a rectangular region |
| top_left_x | X coordinate of the top left corner position of the current SPR |
| top_left_y | Y coordinate of the top left corner position of the current SPR |

As shown in table 1, the region descriptor may include a first region descriptor identifier ("id"), identifying the descriptor of a region video frames associated with a (first) adaptation set to which the spatial playback region descriptor belongs to. This first region descriptor identifier may be referred to in short as a source identifier.

Further, the descriptor may include one or more parameters (width, height, top_left_x, top_left_y) defining the location (and dimensions) of the source region (expressed in predetermined units). For example, in an embodiment, the parameters associated with the location (and dimensions) of a source region may be expressed as a percentage of a video frame and are multiplied by the video resolution to obtain the exact position in pixel units. For example, if width is 50% and the width of viewing resolution is 1920, the SPR is 960 pixels wide. Instead of a percentage notation other units may also be possible, e.g.: normalized values given as real numbers between 0 and 1; width and height in arbitrary units; and, new total_width and total_height parameters to give the ratio. Hence, in this embodiment, the values regarding dimensions may be expressed as a percentage of the respective video resolution. This way a spatial playback region is not defined in pixel units so that it can be used in case of multiple video resolutions, e.g. in the case when there are multiple Representation in the adaptation sets with different picture resolutions.

A region descriptor may further comprise at least a second region descriptor identifier ("region") for identifying a destination region descriptor associated with a second adaptation set. This parameter may be referred to in short as a destination identifier. The destination identifier signals the HAS client device that the region defined by the source region descriptor refers to a destination region descriptor, i.e. a region descriptor identified by the destination identifier, wherein the destination region descriptor is associated with a further (second) adaptation set.

The spatial playback region descriptor may further comprise a playback period identifier ("period") associated with the destination region identifier signalling a client device that the second adaptation set belongs to the second playback period. This parameter may be referred to in short as a period identifier. Examples of these parameters are provided in Table 2:

TABLE 2

SpatialPlaybackRegion with content selection information

| SpatialPlaybackRegion | Purpose of parameter |
|---|---|
| ... | |
| region | List of SpatialPlaybackRegion@id from which the parent Adaptation Set(s) in the next Playback Period must be selected |
| period | Period@id of the next Playback Period (may not be the next Period in the MPD) |
| label | A word or phrase associated with the SPR |

Hence, the period and destination parameters in the first region descriptor are used to link a region in a first adaptation set to a second region descriptor associated with a second adaptation set of a second playback period. The HAS client device will determine that adaptation sets are linked if the destination parameter of the first region descriptor matches the source parameter of the second region descriptor. An example of this mechanism is described with reference to the MPD in table 3 hereunder.

The region descriptor may further comprise a parameter called "label" that may serve for human readability as well as voice control (matching what the user said and the label). It may serve for visually impaired people, having the application read out or display the text associated with the label so the user can know what to choose.

Table 3 below provides an example of an MPD including a region descriptor according to an embodiment of the invention. In this example, a region may be defined by width, height and the position of its top left corner within a video frame. However, in other embodiments other conditions and/or parameters may be used to define the regions.

In this embodiment, an MPD element may signal the HAS client device that the video relates to spherical video. In particular, an EssentialProperty MPD element including an @schemeIdUri attribute of value 'urn:mpeg:mpegB:cicp:PF' may signal the client device that the video is a 360 video formatted in the equirectangular projection format as specified by the MPEG OMAF specification, ISO/IEC 23090-2.

TABLE 3

Example of a MPD with the SpatialPlaybackRegion

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <Period id="1">
        <!-- First Playback period -->
        <AdaptationSet segmentAlignment="true" subsegmentAlignment="true"
subsegmentStartsWithSAP="1">
            <!-- This SPR links to region 'a' in Period@id=2 -->
            <SpatialPlaybackRegion period="2" region="a" width="50%" height="20%" top_left_x="25%"
top_left_y="30%"/>
            <!-- This SPR links to region 'b' in Period@id=3-->
            <SpatialPlaybackRegion period="3" region="b" width="50%" height="20%" top_left_x="50%"
top_left_y="50%"/>
            <Representation mimeType="video/mp4" codecs="avc1.42c01e" width="450" height="800"
bandwidth="269011" startWithSAP="1">
                <BaseURL>full_video_1_360.mp4</BaseURL>
                <SegmentBase indexRangeExact="true" indexRange="837-988"/>
                <EssentialProperty schemeIdUri="urn:mpeg:mpegB:cicp:PF" value="0 "/>
            </Representation>
        </AdaptationSet>
    </Period>
    <Period id="2">
        <!-- Second Playback period -->
```

TABLE 3-continued

Example of a MPD with the SpatialPlaybackRegion

```
        <AdaptationSet segmentAlignment="true" subsegmentAlignment="true"
subsegmentStartsWithSAP="1">
            <!-- This SPR links to region 'c' in Period@id=4 -->
            <SpatialPlaybackRegion id="a" region="c" period="4" width="100%" height="100%"
top_left_x="100%" top_left_y="100%"/>
                <Representation mimeType="video/mp4" codecs="avc1.42c01e" width="450" height="800"
bandwidth="269011" startWithSAP="1">
                    <BaseURL> full_video_2_360.mp4</BaseURL>
                    <SegmentBase indexRangeExact="true" indexRange="837-988"/>
                    <EssentialProperty schemeIdUri="urn:mpeg:mpegB:cicp:PF" value="0 "/>
                </Representation>
        </AdaptationSet>
    </Period>
    <Period id="3">
        <!-- Third Playback period -->
        <AdaptationSet segmentAlignment="true" subsegmentAlignment="true"
subsegmentStartsWithSAP="1">
            <!-- This first SPR links to region 'c' in Period@id=4 -->
            <SpatialPlaybackRegion id="b" region="c" period="4" width="100%" height="100%"
top_left_x="100%" top_left_y="100%"/>
                <Representation mimeType="video/mp4" codecs="avc1.42c01e" width="450" height="800"
bandwidth="269011" startWithSAP="1">
                    <BaseURL> full_video_3_360.mp4</BaseURL>
                    <SegmentBase indexRangeExact="true" indexRange="837-988"/>
                    <EssentialProperty schemeIdUri="urn:mpeg:mpegB:cicp:PF" value="0 "/>
                </Representation>
        </AdaptationSet>
    </Period>
<Period id="4">
        <!-- Fourth and last Playback period -->
        <AdaptationSet segmentAlignment="true" subsegmentAlignment="true"
subsegmentStartsWithSAP="1">
            <!-- This SPR links to no region since it is the last Playback Region in the MPD -->
            <SpatialPlaybackRegion id="c"/>
                <Representation mimeType="video/mp4" codecs="avc1.42c01e" width="450" height="800"
bandwidth="269011" startWithSAP="1">
                    <BaseURL> full_video_3_360.mp4</BaseURL>
                    <SegmentBase indexRangeExact="true" indexRange="837-988"/>
                    <EssentialProperty schemeIdUri="urn:mpeg:mpegB:cicp:PF" value="0 "/>
                </Representation>
        </AdaptationSet>
    </Period>
</MPD>
```

Figure 6:
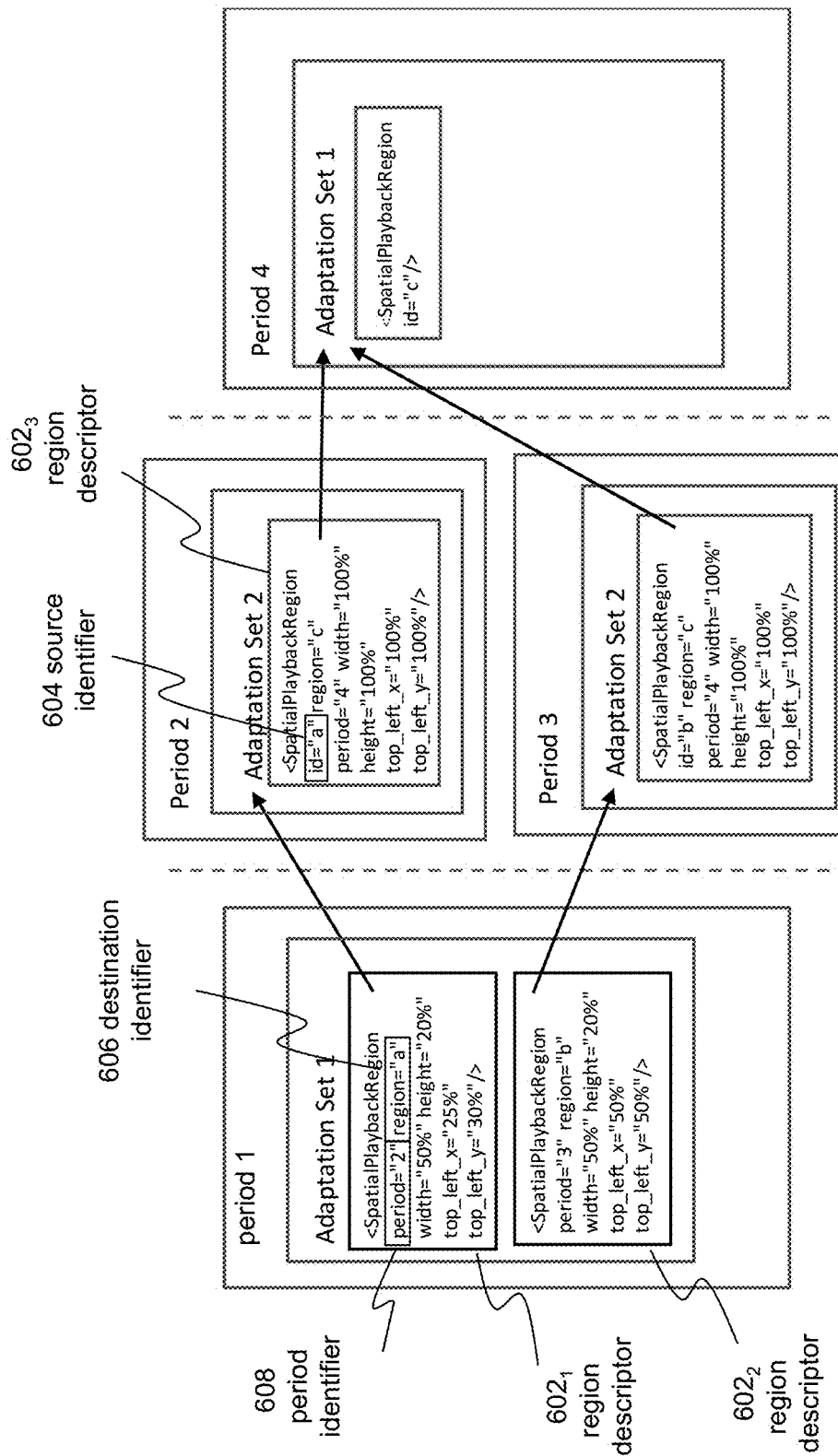
FIG. 6 schematically depicts the linking of adaptation sets in a manifest file using region descriptors according to an embodiment of the invention.

As shown in this embodiment, the MPD defines a plurality of playback periods (in this example four) which are linked to each other using region descriptors. The linkage of the adaptation sets using spatial region descriptors as described in table 3 is illustrated in FIG. 6. This figure depicts a data structure defining a playback period 1 including an adaptation set 1 which is associated with two regions descriptors $602_1, 602_2$. The first region descriptor $602_1$:

```
<SpatialPlaybackRegion period="2" region="a" width="50%"
    height="20%" top_left_x="25%" top_left_y="30%"/>
``` defines (width, height, and coordinates of) a region which is linked to a further adaptation set of playback period 2. The first region descriptor includes a destination identifier 606 (region="a") and a period identifier 608 (period="2"). The destination and period identifier in the first region descriptor signal the HAS client device that the region described by the first region descriptor is linked to an adaptation set, which is associated with a region descriptor $602_3$ that has a source identifier 604 (id="a") that matches the destination identifier 606 of the first region descriptor $602_1$. The period identifier in the first region descriptor signals de HAS client that the region descriptor identified by the destination identifier is defined by the metadata of playback period 2. Indeed, as shown in table 3, the metadata of playback period 2 includes a region descriptor with an identifier "a":

```
<SpatialPlaybackRegion id="a" region="c" period="4"
    width="100%" height="100%" top_left_x="100%"
    top_left_y="100%"/>
```

This way, when parsing the manifest file the HAS client device may determine that the region in video frames associated with adaptation set 1 of playback period 1 is linked to adaptation set 2 of playback period 2. In a similar way, the HAS client device may determine on the basis of the second region descriptor 604 that a further region in video frames associated with adaptation set 1 is linked to an adaptation set 2 of playback period 3 and on the basis of the region descriptors of adaptation set 2 of playback periods 2 and 3 it may determine that regions in video frames associated with adaptation set 2 of playback period 2 and 3 are both linked to adaptation set 1 of playback period 4. It is noted that the example of table 3 and FIG. 6 is merely an illustration of how the region descriptors can be used to efficiently link different adaptation sets to each other in order to form a data structure, e.g. an XML data structure, representing multiple playback paths where each playback path may provide a different user experience.

Figure 7A:
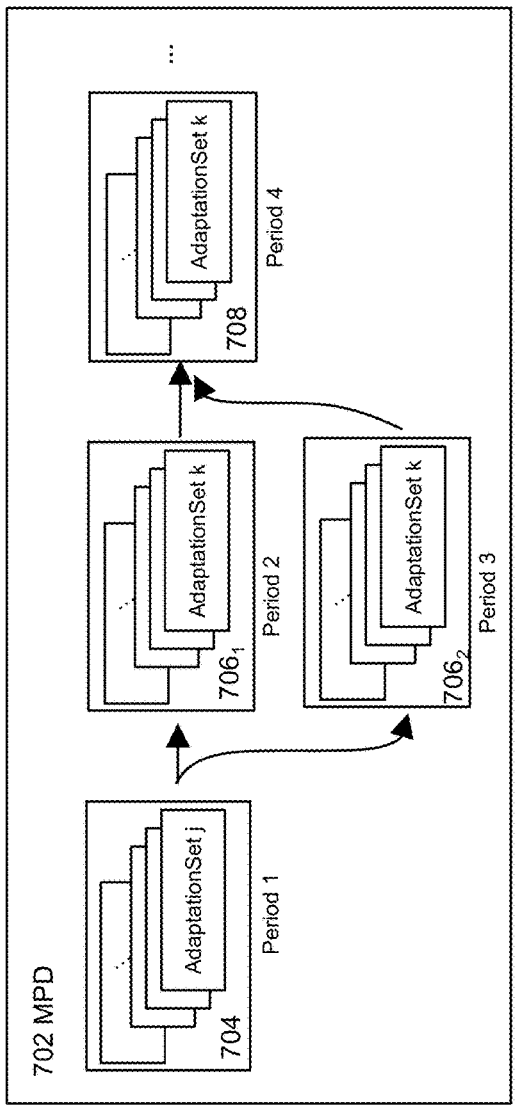
FIG. 7A depicts various manifest files for enabling adaptive streaming of nonlinear media according to an embodiment of the invention.
Figure 7B:
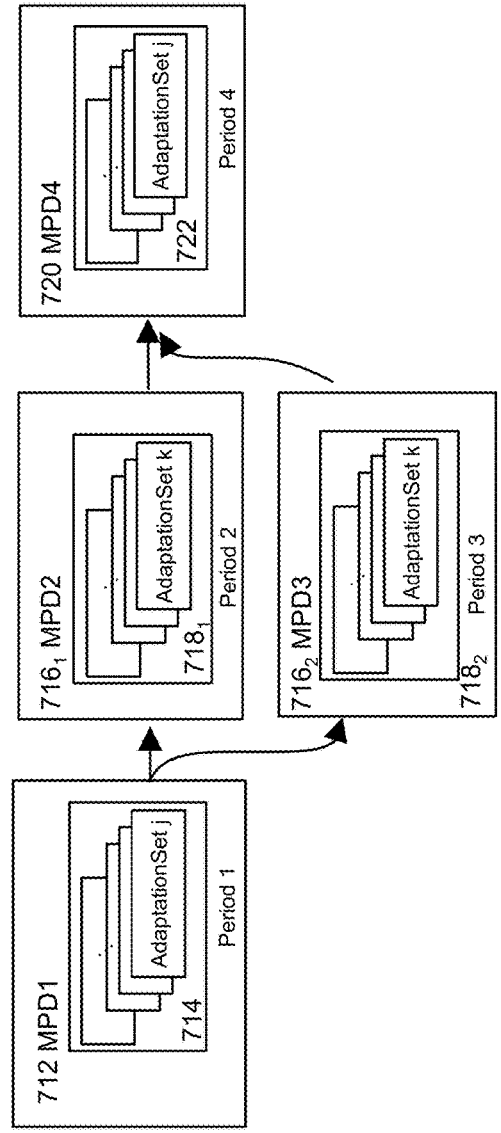
FIG. 7B is another depiction of various manifest files for enabling adaptive streaming of nonlinear media according to an embodiment of the invention.

FIGS. 7A and 7B depict various manifest files for enabling adaptive streaming of nonlinear media according to an embodiment of the invention. In particular, FIG. 7A schematically depicts a manifest file 702 including adaptation sets associated with different playback periods 704-708, wherein the adaptation sets of different playback periods in the manifest file are structured and linked using spatial playback region descriptors as described with reference to FIG. 6 and table 3. In this embodiment, the manifest file includes all metadata that is needed by the HAS client to select a second (further) adapation set for playout after the end of the playout of a first (current) adapation set on the basis of user information, e.g. information about the user interacting or not interacting with regions defined in the video frames associated with the first adapation set. The "interaction" of the user with a spatial playback region may be determined on the basis of the viewing behaviour of the user, e.g. information that a user looked for a predetermined time (or an average time) in the direction of one of the regions of the adapation set of playback period 1.

The sequence of the playback period elements listed in the MPD no longer means that the HAS client device should play these playback periods back in the order the periods are listed. On the contrary, the HAS client device has to take into account the spatial playback region information in order to select an adaptation set from a predetermined number of adaptation sets listed in the MPD. Spatial playback descriptors linking the adaptation sets in the different playback periods may be defined by the MPD author.

In an alternative embodiment, the HAS client device may use the spatial playback information in the manifest file in order to request a server to transmit metadata of a selected adaptation set to the client device. Hence, in this embodiment, metadata of one or more selected adaptation sets a next playback period may be transmitted to the HAS client device in one or more further MPDs by a server, e.g. a manifest file server, to the HAS client device.

As shown in FIG. 7B, the selection by the HAS client device of an adapation set from a plurality of adaptation sets triggers the manifest file server to transmit a new MPD or MPD update patch comprising the metadata of the selected adapation set to the HAS client. The manifest file server may comprise a database in which metadata of all playback paths is stored. When the server receives a request for metadata associated with one or more selected adaptation sets from a HAS client device, it may parse the metadata database, select the requested part, generate a new MPD and transmit the MPD to the client device.

In an embodiment, an extended version of the MPD chaining scheme as specified in the DASH standard ISO/IEC 23009-1 may be used to transmit the new MPD to the HAS client device. MPD chaining provides a mechanism to indicate that at the end of one media presentation described in a first MPD a new media presentation associated with a subsequent second MPD starts. In the conventional chaining mechanism, the first MPD may include an MPD chaining element, e.g. in the form of an Essential Property MPD element or Supplemental Property element, which points to the location of a server which is configured to transmit a new (second) MPD or MPD update to the HAS client device. A client device that is playing back video on the basis of metadata in the first MPD, will be triggered by the MPD chaining element to request a further MPD so that it can continue video playback on the basis of metadata in the second MPD right after the end of the video playback based on the first MPD.

In contrast, in this embodiment the MPD chaining scheme is extended so that an MPD chaining element can be included in the region descriptor, e.g. a SpatialPlayback MPD element as described above with reference to tables 1 and 2. In an embodiment, the MPD chaining element according to the invention may include an URL and a destination identifier and a period identifier wherein the URL is used by the client device to request a new MPD. Once the client device receives a response message comprising the new MPD, it may use the destination identifier and the period identifier in order to select metadata associated with the next adaptation set from the new MPD.

Table 4 below provides an example of a syntax of an MPD chaining element for selection of an adaptation set for the next playback period.

TABLE 4

| | | Content selection of next playback period on the basis of a new MPD | |
|---|---|---|---|
| | Attributes | Purpose of parameter | Example |
| EssentialProperty | schemeIdUri value | Used to signal MPD chaining Contains the URL where the next MPD is, as well as the period and destination identifier | urn:mpeg:dash:mpd-chaining:2016 server.com/next.mpd# period=1®ion=d |

As shown in this table, the main difference with conventional MPD chaining is that normally the MPD chaining element is a child of the element MPD, while in this embodiment, the MPD chaining element is used as a child of an adaptation set thereby providing much more flexibility in its use. An example of the use of an MPD chaining element according to an embodiment of the invention is provided below:

playback period 1 that includes two region descriptors, a first region descriptor including a first MPD chaining element and a second region descriptor including a second MPD chaining element. Here, the first and second region descriptor may signal the HAS client device that a first region in the video frames associated with an adaptation set in period 1 is linked to an adapation set of playback period 2 and a second region in the video frames is linked to an adapation set of

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <Period id="1">
        <!-- First Playback period -->
        <AdaptationSet segmentAlignment="true" subsegmentAlignment="true"
subsegmentStartsWithSAP="1">
            <!-- This SPR links to region 'a' in Period@id=2 in the MPD located at server.com/next.mpd -->
            <SpatialPlaybackRegion period="2" region="a" width="50%" height="20%" top_left_x="25%"
top_left_y="30%">
                <EssentialProperty schemeIdUri="urn:mpeg:dash:mpd-chaining:2016"
value="server.com/next.mpd#period=
2®ion=a"/>
            </SpatialPlaybackRegion>
            <!-- This SPR links to region 'b' in Period@id=2 in the current MPD -->
            <SpatialPlaybackRegion period="2" region="b" width="50%" height="20%" top_left_x="50%"
top_left_y="50%"/>
            <Representation mimeType="video/mp4" codecs="avc1.42c01e" width="450" height="800"
bandwidth="269011" startWithSAP="1">
                <BaseURL>full_video_1_360.mp4</BaseURL>
                <SegmentBase indexRangeExact="true" indexRange="837-988"/>
                <EssentialProperty schemeIdUri="urn:mpeg:mpegB:cicp:PF" value="0 "/>
            </Representation>
        </AdaptationSet>
    </Period>
    <Period id="2">
        <!-- Second Playback period -->
        <AdaptationSet segmentAlignment="true" subsegmentAlignment="true"
subsegmentStartsWithSAP="1">
            <SpatialPlaybackRegion id="b"/>
            <Representation mimeType="video/mp4" codecs="avc1.42c01e" width="450" height="800"
bandwidth="269011" startWithSAP="1">
                <BaseURL> full_video_2_360.mp4</BaseURL>
                <SegmentBase indexRangeExact="true" indexRange="837-988"/>
                <EssentialProperty schemeIdUri="urn:mpeg:mpegB:cicp:PF" value="0 "/>
            </Representation>
        </AdaptationSet>
    </Period>
</MPD>
```

As shown in this example, a first region descriptor defines a region which refers to an adaptation set in playback period 2 wherein the adaptation set is associated with a region descriptor which is identified by destination identifier "a". The first region descriptor further includes an MPD chaining element which signals the HAS client device that the adaptation set in period 2 is located in another MPD that can be requested by sending a request with the URL as provided in the value attribute.

According to the general URL specification, all information after the "#" is meant for the client device and this part is stripped off before sending the HTTP request to the server. The client device thus sends the HTTP request to the URL server.com/next.mpd. When the client receives the response comprising the new MPD, it looks for a section in the MPD pointed by #period=1®ion=d.

FIG. 7B schematically illustrates linking adaptation sets of playback periods using an MPD chaining scheme according to an embodiment of the invention. As shown in this figure, a first MPD 712 may define an adaptation sets of playback period 3. Additionally, the MPD chaining element in the first and second region descriptors signals the HAS client device that the video data of the adaptation sets of period 2 and 3 have to be played back on the basis of metadata of a second MPD $716_1$ and the adaptation in sets of period 3 have to be played back on the basis of a third MPD $716_2$.

In yet other embodiment, a next playback period may be signaled using an MPD update event scheme as defined in ISO/IEC 23009-1. In this embodiment, instead of transmitting a complete new MPD, the metadata of the next playback period may be transmitted as an update patch to the HAS client device. The update patch may include the metadata and instructions for the HAS client device to insert the metadata in the manifest file it is using.

In a first embodiment, an MPD validity expiration event may be inserted in the client's MPD associated with playback time, meaning that a client will download a new MPD at a determined playback time where the MPD ceases to be valid.

In the second embodiment, an MPD validity expiration event may be inserted in a segment a client device is downloading.

In both cases, when the client device is at the playback time as indicated by the MPD validity expiration event, a new MPD will be sent by the server to the client device. In an embodiment, the server may send the MPD upon expiration or a predetermined time before expiration to the client device. In another embodiment, the client device may request the server to send the MPD before expiration to the client device. The new MPD comprises the next Playback Period and the client device may continue playback in the normal way.

In Table 5 below parameters for such a validity expiration event are provided. The presentation_time and timescale parameters may be content dependent and are used by the client device in order to determine at what time instance in the media playback the client device should receive or request an MPD update.

TABLE 5

Parameters for a MPD validity expiration event

| Attributes | Purpose of Parameter | Example |
| --- | --- | --- |
| schemeIdUri | Used to signal an MPD event | urn:mpeg:dash:event:2012 |
| value | Defines the type of event. 1 corresponds to an MPD validity expiration | 1 |
| timescale | Provides the timescale, in ticks per second | 5000 |
| presentation_time | The Media Presentation Time of the event, in the timescale from timescale field | 10 000 |

Figure 8:
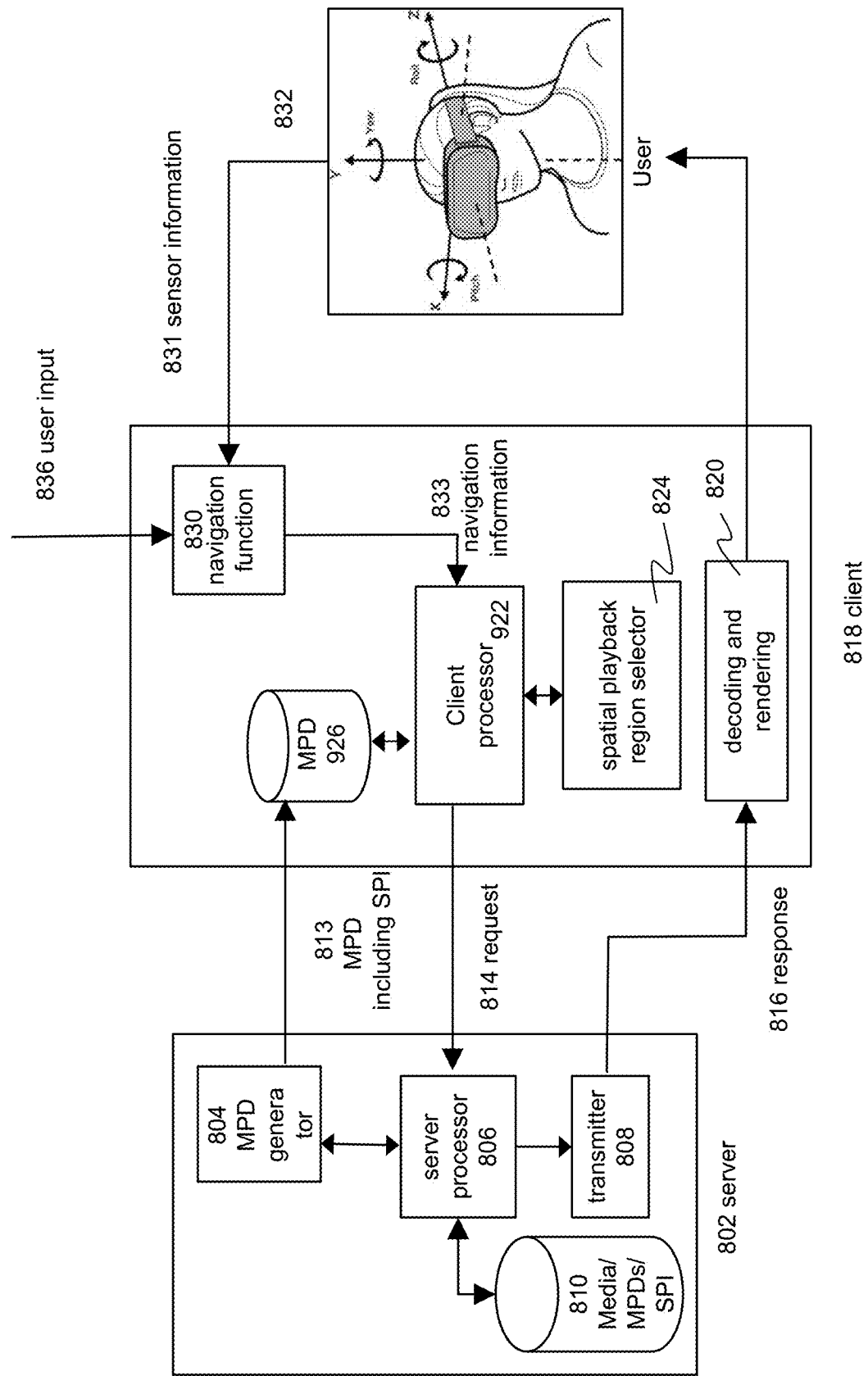
FIG. 8 depicts a system for adaptive streaming of nonlinear media according to an embodiment of the invention.

FIG. 8 depicts a system for adaptive streaming of nonlinear media according to an embodiment of the invention. In particular, FIG. 8 depicts a system for adaptive streaming of nonlinear media including a server 802, e.g. a media server, comprising a server processor 806 and a server storage medium 810 for storing media, e.g. spherical video data, in a suitable data container format and associated metadata, e.g. one or more manifest files that are used by client devices to retrieve media. A manifest file may be referred to in MPEG DASH as a Media Presentation Description (MPD) and may be structured in accordance with a certain machine-readable document format, e.g. XML or the like.

A manifest file may comprise information on the available media assets, e.g. media streams including video and audio streams, and how a HAS client can retrieve these media assets. The media data identified in the manifest file may be organized on the basis of a data model as described with reference to FIG. 3, e.g. playback periods including one or more adaptation sets, an adaptation sets including different representations and a representation including a sequence of media segments, wherein a media segment includes a compressed video data of a predetermined quality.

In some embodiments, the media streams in the manifest file may also be spatially divided ("tiled") in (spatial) tile streams, wherein the spatial relation of the tile streams may be defined using a spatial relation description (SRD). The manifest either directly provides the URLs to request these segments or alternatively provides metadata for the HAS clients to build the segment URLs to be requested. The MPD may offer different ways for signalling the segment URLs, URL templating, explicit URLs, etc. Additionally, the metadata may also include spatial playback information as described in detail with reference to FIG. 1-7.

The client device 818 may comprise a client processor 822 and a memory 826 for storing one or more manifest files, including the manifest file the client device is currently using. The client and server processor may be configured to manage and execute process steps associated with the playback of nonlinear spherical video as described with references to the embodiments in this application.

The server may be part of a content delivery network (CDN) that is configured to stream video data to client devices. The client device 818 may be implemented or associated with a video processing device 832.

In an embodiment, the video data may include spherical video data, i.e. a spherical representation of video content (e.g. pixels) onto a spherical surface wherein the position of the pixels on the spherical surface may be defined on the basis of a 3D spherical coordinate system. The video processing devices may be configured to process spherical video data and to render the spherical video data for display.

A non-limiting example of a video processing device for spherical content is a head-mounted display (HMD). Such devices are often used in applications that include spherical video, virtual reality and augment reality. A HMD may comprise one or more sensors for tracking head, eye and/or body movements of a user.

One or more sensors in the video processing device may generate sensor information 831, which may be used to determine a viewpoint, i.e. a direction in 3D space in which the user of the video processing device is looking towards on the surface of a sphere, wherein the user is located at the center of the sphere. A viewpoint may be expressed on the basis of coordinates of a spherical coordinate system. A HMD may be further characterized by a field of view (FOV), i.e. the largest area of the spherical video that the HMD is able to display. At a particular viewpoint at a particular moment in time, the specific part of the spherical video being displayed under the limitation of the FOV is called viewport. The viewport may also be referred to as a region of interest (ROI) on the spherical surface. The video processing device may be configured to render a spherical representation of video content, wherein a user may freely select spherical video by moving the ROI over the spherical surface. The ROI may be moved by moving the video processing device or by tracking head, eye and/or body movements of a user. Hence, during rendering, a viewing direction of a user (e.g. a viewpoint) may be monitored by the video processing apparatus, e.g. a HDM, and used to determine which part of the content should be rendered according to the FOV and the current viewpoint direction of the video processing apparatus.

The sensor information may be sent to the client device, which comprises or may be associated with navigation function 830, which is configured to receive the sensor information and generate navigation information $833_{1,2}$. The navigation information may include navigation metrics of a user of the video processing device, including one or more parameters that provide information about the viewing behavior of the user. These parameters may include current viewpoints, historic viewpoints and/or other metrics, e.g. motion information, dimensions and shape of the field of view that is displayed to the user, etc. In a further embodiment, navigation function may receive user input 836 for generating navigation information. The user input may include information related to various user interaction interfaces of the video processing device, e.g. a voice control application and/or a (3D) gesture recognition application. This information may be used in addition to or instead of the viewpoint information.

The client device may be configured to use metadata in the MPD, e.g. segment identifiers (e.g. URLs) or information to generate segment identifiers, for transmitting request messages 814, e.g. HTTP requests, to the server. The request messages may comprise segment identifiers so that the server is able to select segments from the storage medium and instruct a transmitter 808 to send the requested video data (e.g. in the form of segments) in one or more response messages 816, e.g. HTTP response messages, to the client device. The video data may be transmitted as a coded bitstream to the client device. A decoding and rendering module 820 associated with the client device may buffer the bitstream, decode it into video frames, transform the video frames into spherical video and render the spherical video using the video processing device.

The client device may be further configured to request the server to transmit a new manifest file, e.g. MPD, e.g. in case all video content in the manifest file is played back or in case the manifest file is outdated. For example, the client device may request a manifest file update (e.g. an MPD update patch) which can be used by the client device to update parts of the manifest file that is stored in the memory of the client device. The MPD update mechanism may be configured to provide the client device with a new MPD or MPD update while it is rendering video on the basis of a current MPD. Alternatively, the client device may be configured to receive a new MPD from the server, without explicitly requesting the server to do so. For example, the current MPD may have metadata in the MPD signaling the client device that the server will transmit a new MPD after a predetermined time. This way continuous playback of the spherical video can be guaranteed.

An MPD generator 804 may be configured to generate MPDs or MPD update patches 813. In some embodiments, an MPD or an MPD update patch, may include spatial playback information as described above with reference to FIG. 3-7 above. During playback, the client processor may parse the MPD and use the spatial playback information in the MPD to playback video data of adaptation sets as defined in the MPD.

The client may select an adaptation set of a next playback period using the metadata in the MPD. To that end, a client-side spatial playback region selector 824 may use the navigation information 833 of the navigation function and the spatial playback information in the MPD to select a next adaptation set from a plurality of adaptation sets that are linked to regions in video frames associated with an adaptation set the client device is currently processing.

A spatial playback region may be defined in different ways. A spatial playback region may be static, i.e. its coordinates are static for the entire playback Period it belongs to. Hence, in that case, the coordinates of the spatial playback region may be inserted in the MPD. Table 1 describes an example of a syntax of a static playback region.

In an embodiment, the position and/or the size of a spatial playback region may change over time during a playback period. Such dynamic spatial playback region is very useful if the content creator wants to associate a spatial playback region with a moving object in the scene. To this end, the coordinates of the region may be stored along with the video of the scene in a predetermined file structure. For example, in an embodiment, the coordinates of a region may be stored as a timed metadata track. In an embodiment, the '2dcc' sample entry as specified ISO/IEC 23001-10:2015/FDAmd 1 may be used to store the timed metadata track. In this embodiment, the DynamicSpatialPlaybackRegion element may then include attributes as shown in Table 6.

TABLE 6

Dynamic Spatial Region Playback coordinates

| DynamicSpatialPlaybackRegion | Semantic of parameters |
|---|---|
| id | Identifier of the current SPR |
| coordinates | Id of the representation containing the coordinates of the region as timed metadata track |

An example of an MPD illustrating the usage of a dynamic spatial region playback region is provided in Table 7 below.

TABLE 7

MPD example including metadata for a dynamic playback region

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <Period>
        <!--First Playback period -->
        <AdaptationSet segmentAlignment="true"
        subsegmentAlignment="true"
subsegmentStartsWithSAP="1">
        <DynamicSpatialPlaybackRegion id="1"
        coordinates="spr-coordinates"/>
            <Representation id="scene mimeType="video/mp4"
            codecs="avc1.42c01e" width="450"
height="800" bandwidth="269011" startWithSAP="1">
                <BaseURL> full_video_lowres.mp4</BaseURL>
                <SegmentBase indexRangeExact="true"
                indexRange="837-988"/>
            </Representation>
        </AdaptationSet>
        <AdaptationSet segmentAlignment="true"
        subsegmentAlignment="true"
subsegmentStartsWithSAP="1">
            <Representation id="spr-coordinates"
            associationId="scene" associationType="cdsc"
codecs="2dcc" bandwidth="100">
                <BaseURL>spr_coordinates.mp4</BaseURL>
            </Representation>
        </AdaptationSet>
</Period>
</MPD>
```

In a further embodiment, instead of an explicit geometric definition, an analytic definition of the region may be used, e.g. as conditions to be met by a pair of points in the 2D space as defined in the SpatialPlaybackRegion element. Table 8 provides an example of a syntax of such analytic definition of a region.

TABLE 8 example of an analytic description of a region

| SpatialPlaybackRegion | Semantic of parameters |
|---|---|
| id | Identifier of the current SPR |
| widthGreaterThan | Region is defined as having an x coordinate greater than |
| widthSmallerThan | Region is defined as having an x coordinate smaller than |

TABLE 8-continued example of an analytic description of a region

| SpatialPlaybackRegion | Semantic of parameters |
|---|---|
| heightGreaterThan | Region is defined as having an y coordinate greater than |
| heightSmallerThan | Region is defined as having an y coordinate smaller than |

In a further embodiment, shaped boundaries between regions may be defined in a SpatialPlaybackRegion element as conditions to be met by a plurality, e.g. a pair, of points in a 2D space. An exemplary syntax of such definition is provided in Table 9:

TABLE 9 example of a region description by drawing lines and/or circles using two points.

| SpatialPlaybackRegionDivider | Semantic of parameters |
|---|---|
| Shape | Define the type of the divider:<br>- Line<br>- Circle<br>- Etc . . . |
| xValue | Line that is drawn vertically down at the value of width<br>Only present if @shape equals "line" |
| yValue | Line that is drawn horizontally left at the value of height<br>Only present if @shape equals "line" |
| circleCentreX | X coordinate of the centre of circle divider<br>Only present if @shape equals "circle" |
| circleCentreY | Y coordinate of the centre of circle divider<br>Only present if @shape equals "circle" |
| circleRadius | The radius of the circle divider<br>Only present if @shape equals "circle" |

In a further embodiment, a region may be defined using a specific shape, e.g. rectangle or circle. Table 10 below provides the definition of a circular region.

TABLE 10

Circular shaped Spatial Playback Region

| SpatialPlaybackRegion | Semantic of parameters |
|---|---|
| Id | Identifier of the current SPR |
| circleCentreX | X coordinate of the centre of the current SPR |
| circleCentreY | Region is defined as a circle, this is the centre of the region |
| circleRadius | The distance a point must be from the circleCentre to be included in the region. This is a percentage of the width. |

Figure 9A:
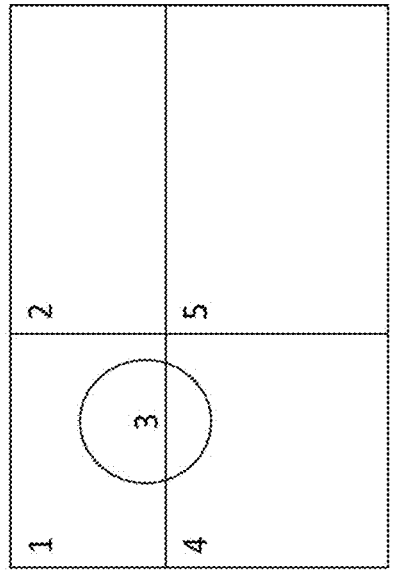
FIG. 9A illustrates the identification of spatial playback regions according to an embodiment of the invention.
Figure 9B:
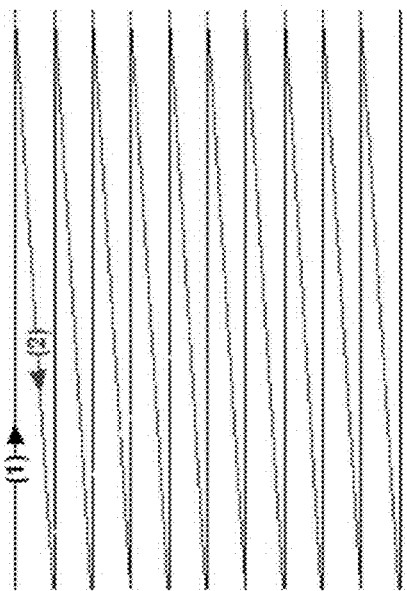
FIG. 9B is another illustration of the identification of spatial playback regions according to an embodiment of the invention.

In addition, it is also possible to add a shape attribute in the definition of the SpatialPlaybackRegion to enable in the same syntax the choice of several region shapes.
In case of implicit signalling of the Spatial Playback Region as shown in Table 7 and 8, separate regions cannot be explicitly indexed by a parametrized value. However, individual identification of a region is required. Hence, in that case, a default ordering of the regions may be proposed.
FIGS. 9A and 9B illustrate the identification of spatial playback regions on the basis of a raster scan ordering scheme according to an embodiment of the invention. In FIG. 9A an example of a raster scan order of pixels is provided moving from the top left position to the lower right position. The scanning order may be used for ordering regions. FIG. 9B depicts a video frame comprising a plurality of spatial playback regions $902_{1-5}$ wherein a number (a spatial playback region identifier) may be associated with the regions according to the applied raster scan ordering convention.

The region space of the spatial playback regions may be defined in different ways. The region space of a spatial playback region may either be mapped onto the pictures (e.g. video frames) of a video or—in case of tiled media streaming—onto the picture formed by a composition of multiple videos.

In an embodiment, the space of a spatial playback region may be defined on the basis of a Cartesian coordinates as e.g. illustrated in the examples of table 1-9 above. In another embodiment, spherical coordinates may be used. Spherical coordinates are especially useful when dealing with spherical video. Spherical coordinates permit a better definition when defining the user's viewpoint in a 360 environment.

Figure 10:
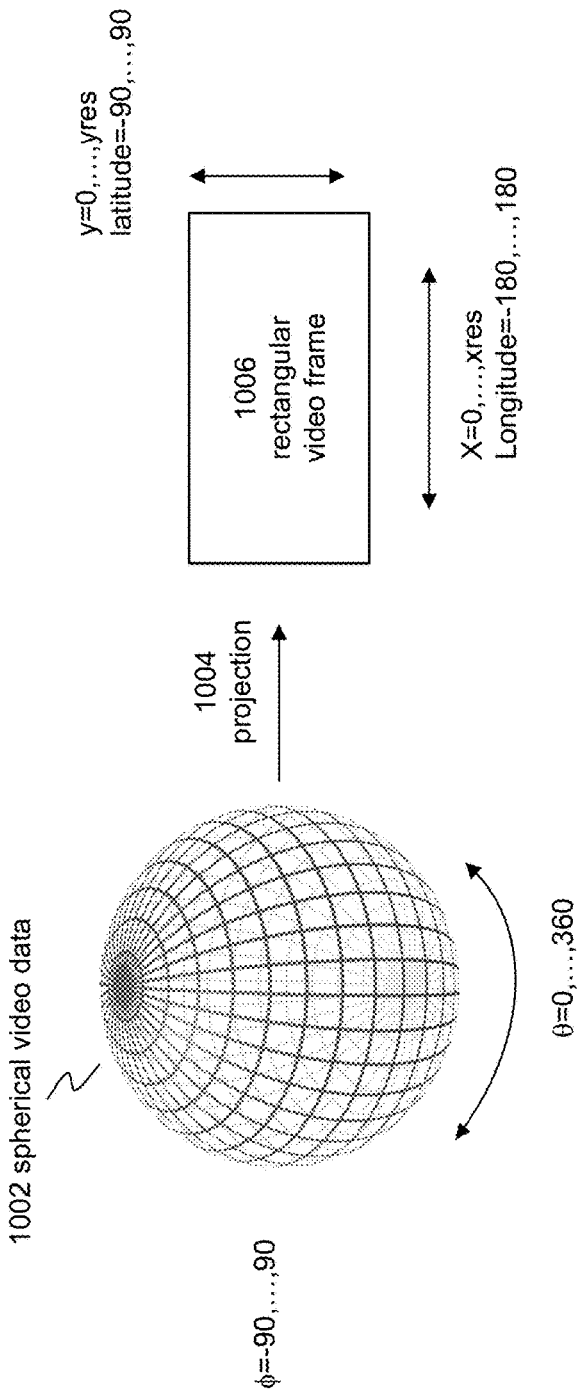
FIG. 10 schematically depicts representations of spherical video data.

FIG. 10 schematically depicts a representation of spherical video data as pixels on a sphere 202 wherein the position of a pixel on the sphere may be described by a longitude and latitude coordinates. Such spherical video data may be generated by a panoramic or 360-degree image capturing system, which typically comprises multiple, i.e. two or more image sensors. Images of overlapping field of views, generated by different image sensors, may be stitched together into one panorama or high-resolution image. As state-of-the-art codec standards are not capable of handling spherical video data, the spherical video data are transformed into a 2D video frame format before the video data are provided to the input of a video encoder. Such transformation typically includes a projection operation 1004 which projects the 3D spherical video data onto a 3D rectangular area of a video frame 1006. In an embodiment, an equirectangular projection operation may be used to directly transform pixels associated with spherical coordinates $\phi,\theta$ to pixels associated with planar 2D coordinates X,Y. Instead of an equirectangular projection another projection may be used, e.g. a cubic projection, wherein the sphere is placed in a 3D cube and wherein pixels on the sphere are projected on the 2D surfaces of the cube. The 2D surfaces are subsequently arranged in a 2D rectangular format that can be processed by a state of the art encoder.

Figure 11B:
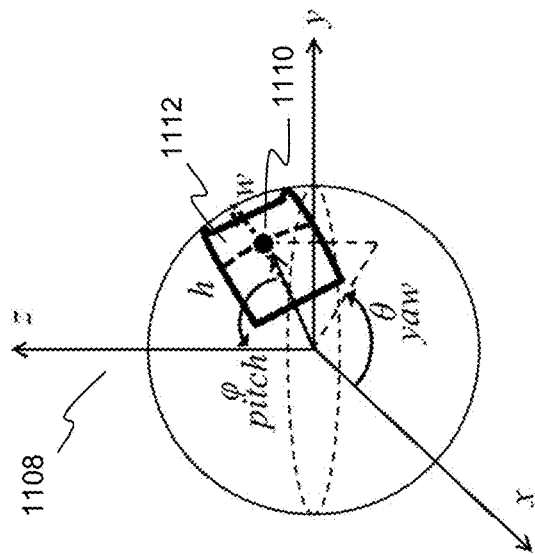
FIG. 11B is another illustration of the use of a spherical coordinate system for describing a viewport.
Figure 11A:
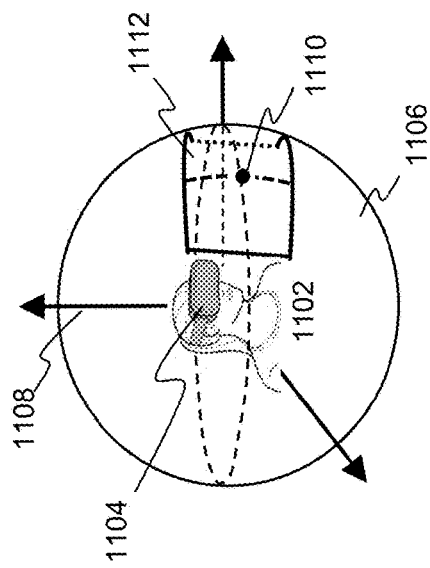
FIG. 11A illustrates the use of a spherical coordinate system for describing a viewport.

FIGS. 11A and 11B illustrate the use of a spherical coordinate system for spherical video. FIG. 11A depicts a user 1102 associated with or wearing a video processing device 1104, which is configured to render spherical video. The user is positioned in the center of a sphere 1106 and the viewing direction of a user viewing the direction of a viewpoint 1110 on the sphere may be defined with respect to the axis of a 3D Cartesian coordinate system 1108. The video processing device is configured to request and receive content, including spherical content, from the network and to render spherical content in a viewport 1112, a region of interest on the sphere, to the user.

FIG. 11B illustrates a viewport defined on the basis of a 3D spherical coordinate system, wherein a yaw-pitch-roll Euler angle convention system may be used to represent the rotation of the viewer heads in a 3D Cartesian coordinate system. A radius, elevation, azimuth angular coordinate system (also known as spherical coordinate system) may be used to represent regions on a sphere. Here, the azimuth ranges between 0 and 360 degrees, and elevation range between −90 and +90. The starting (0-degrees) position of the yaw axis may be chosen arbitrarily by a content provider, or be consistent with the cardinal directions with 0 and 360 degrees representing North, 90 degrees representing East, 180 degrees representing South and 270 degrees representing West. For the pitch axis, the positive values may represent direction above the horizon and negative values represent directions below the horizon. For the roll axis, the assumption may be made that positive values indicate that the left eye of the user is higher than the right eye, and conversely negative values indicate that the user's head is tilted in the opposite way (with the left eye being lower than the right eye).

In an embodiment, three angular parameters (a spherical viewport coordinate) may be used to indicate the position of the ROI on the sphere. In an embodiment, the three elevation-azimuth-orientation angles ($\phi$, $\varphi$, $\psi$) may be used to indicate the direction of the viewport (the center of the viewport being located on the sphere at the position r, $\theta$, $\varphi$) and the orientation $\psi$ of the viewport. The boundaries of the viewport may be preconfigured in the client device or may be determined by the client device based on the FOV. Additionally, the boundaries of the viewport may be based on information on where the viewport needs to be projected.

In an embodiment, the viewport on a sphere may have the shape of a spherical polygon. For these polygons, it holds that each side is defined a line segment of a great-circle. For example, the viewport 1112 depicted in FIG. 11B illustrates a spherical polygon that has the shape of a rectangular on a sphere. A number of angular coordinates may be used to define a such rectangular spherical polygon. For example, five angular coordinates may be used to define a rectangular ROI on the sphere, including: $\theta$, $\varphi$, $\psi$, the three elevation-azimuth-orientation angles to indicate the viewport direction (the viewpoint being the center of the viewport on the sphere being at the position r, $\theta$, $\varphi$) and the orientation of the viewport $\psi$ and the parameters w, h: where w represents the viewport's width in degrees of arc and h represents the viewport's height in degrees of arc. Here the height h may be defined as a segment on the great-circle passing through the viewport's center and having bearing equal to $\psi$. Similarly, the width w may be defined as a segment that is located on the great-circle passing through the viewport's center and substantially orthogonal to the great-circle associated with the height h.

In an embodiment, the coordinate system for describing the viewport of the user may be used to define a spatial playback region on a spherical surface. For example, in an embodiment, a spatial playback region on a sphere may be defined using lower and upper ranges of both angles yaw and pitch. A definition of such region is provided in Table 11.

TABLE 11

Analytic Spatial Playback Region definition on a sphere

| SpatialPlaybackRegion | Semantic of parameters |
| --- | --- |
| Id | Identifier of the SPR |
| yawMin | Beginning of yaw in degrees from the origin |
| yawMax | End of yaw in degrees from the origin |
| pitchMin | Beginning of pitch in degrees from the origin |
| pitchMax | End of pitch in degrees from the origin |

In a further embodiment, a spatial playback region on a sphere may be defined by a point on the sphere, e.g. its center, its size and its shape, i.e. the geometric objects that define the boundaries of the spatial playback region on the sphere. An example of a definition of such region is provided in Table 12.

TABLE 12

Geometric Spatial Playback Region definition on a sphere

Figure 12B:
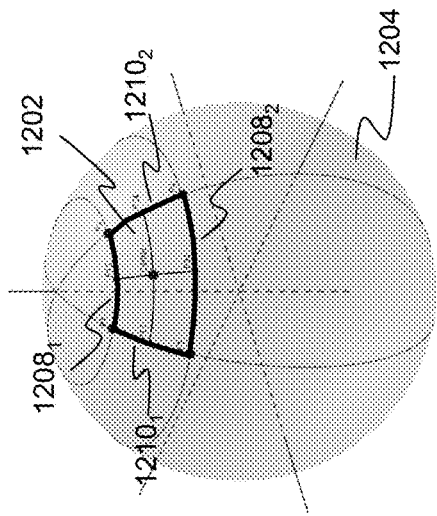
FIG. 12B is another depiction of examples of a spatial playback region on a spherical surface according to various embodiments of the invention.
Figure 12A:
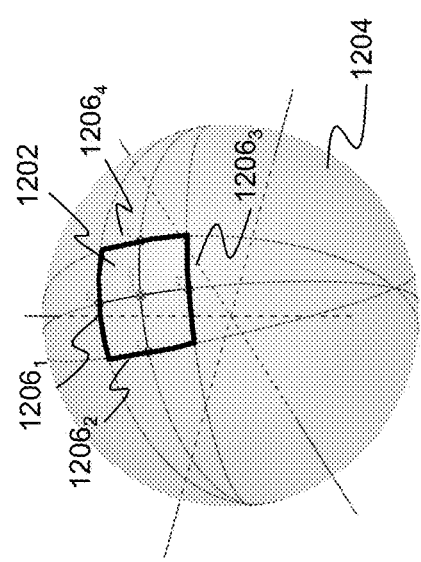
FIG. 12A depicts examples of a spatial playback region on a spherical surface according to various embodiments of the invention.

| SpatialPlaybackRegion | Semantic of parameters |
| --- | --- |
| Id | Identifier of the SPR |
| center_yaw | Center point yaw orientation |
| center_pitch | Center point pitch orientation |
| roll | Roll angle of the SPR |
| hor_range | The width of the SPR in degrees |
| ver_range | The height of the SPR in degrees |
| shape_type | The geometric objects that define the region boundary<br>- "0" specifies that the region is specified by four great circles as shown in FIG. 12A<br>- "1" specifies that the region is specified by two yaw circles and two pitch circles as illustrated in FIG. 12B |

FIG. 12A and FIG. 12B depict examples of a spatial playback region on a spherical surface according to various embodiments of the invention. In particular, FIG. 12A depicts an example of a spherical description of a spatial playback region 1202 on a spherical surface 1204 using four great circles $1206_{1-4}$. FIG. 12B depicts an example of a region 1202 on the spherical surface 1204 specified by two yaw circles $1208_{1,2}$ and two pitch circles $1210_{1,2}$.

As explained with reference to FIG. 8, in some embodiments, a tiled video streaming scheme may be used to playback nonlinear media using the viewpoint of a user of a video processing device. In such tiled video streaming scheme, video content, e.g. a high-resolution panorama video or a high-resolution spherical video, may be either formatted as a set of independent tile streams or as a one HEVC video stream comprising HEVC tiles.

The manifest file may define one or more tile stream identifiers for identifying tile streams, each tile stream may comprise video data of a spatial subpart of a source video, e.g. a large panorama video or a spherical video. For example, a tile may define a spatial subpart of a 2D flat panorama picture so that a tile stream may define an independent video stream wherein the video frames of a tile stream represent a spatial subpart of the video scene represented by the video frames of the panorama video. Similarly, a tile may define a spatial subpart of a spherical surface. In that case, a tile stream may define an independent video stream wherein the video frames of such tile stream represent a subpart of the video scene represented by video frames of the spherical video. Here, the video frames of the tile stream may comprise projected spherical video data, i.e. spherical video data projected onto a 2D flat plane so that the video data can be processed by a conventional codec that is adapted to process video data in the form of flat 2D video frames.

In both cases, the idea is that the client device only downloads the spatial part of the scene (panorama or spherical) that coincides with the current viewport of the user. To that end, the client selects tiles that coincide with the current viewpoint.

To this end, the MPD may use a so-called Spatial Relationship Description (SRD) to express that different Adaptation Sets associated with different tile streams that compose together a full video picture of a scene. The SRD defines the spatial relation between the different video tiles and includes the following parameters:

| parameter | description |
| --- | --- |
| object_x | Top-left corner coordinate of the tile video on the x-axis |
| object_y | Top-left corner coordinate of the tile video on the y-axis |
| object_w | The width of the tile video |
| object_h | The height of the tile video |

Note that this coordinate are expressed in arbitrary unit as specified by the so-called SRD.
An Adaptation Set in an MPD may include an SRD descriptor that follows the syntax of the extended "SRD for VR" proposal of MPEG contribution ISO/IEC JTCC1/SC29/WG11 MPEG2016/m38605, which discloses the following modifications to a conventional SRD. This SRD for VR and 360 video services includes a parameter space within the SupplementalProperty element or EssentialProperty element whose value indicates the type of the spherical video representation.

In the SRD for VR scheme the semantics of the conventional SRD parameters are changed in the sense that coordinates parameters object_x and object_y represent the central position of a tile (also sometimes referred to as a spatial subpart). These parameters represent yaw and pitch angles providing an improved compatibility with the way in which VR or spherical rendering systems process viewpoints. Similarly, the parameters object_width and object_height may represent the width and height of a tile in terms of angular length of the tile on a spherical surface.

Table 13 provides an MPD example for playout of tiled nonlinear media.

defined in terms of a video resolution of a representation in the parent adaptation set, in terms of the reference space defined by the SRD element. For example, in the MPD example of Table 13, the SpatialPlaybackRegion identified by source identifier @id "1" belongs to the Adaptation Set with @id "left" which also has includes an SRD element including the parameters value="0,0,0,1,1,2,1". As a result, the top_left_x, top_left_y, width and height attributes of the spatial playback region (which may be defined on the basis of the syntax of table 1) may be defined relative to the reference space of the SRD element, i.e. to total_width and total_height attributes of the SRD having in this example the values "2" and "1" respectively. Concretely, this implies the following mapping:

Region width=width*total_width
Region width=0,7*2
Region width=1,4
Region height=height*total_height
Region height=1*1
Region height=1

Therefore, SpatialPlaybackRegion with @id "1" converts the region in SRD space from point (0;0) and of size (1,4;1). Using the reference space of the SRD element instead of the video resolution for calculating the position and size of the region, allows to decouple tile boundaries and spatial playback region boundaries which are two different functional tools used by two different entities, the service provider and the content creator respectively.

FIG. 13A-13E illustrate the selection of an adaptation set using a spatial playback region and user input according to

TABLE 13

Spatial playback region in combination with spatial relationship description (SRD)

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <Period>
        <!--First Playback period -->
        <AdaptationSet id="left" segmentAlignment="true" subsegmentAlignment="true"
subsegmentStartsWithSAP="1">
            <!-- Tiled panoramoa - video left part -->
            <SupplementalProperty schemeIdUri="urn:mpeg:dash:srd:2014" value="0,0,0,1,1,2,1"/>
            <SpatialPlaybackRegion id="1" width="70%" height="100%" top_left_x="0%" top_left_y="0%"/>
                <Representation mimeType="video/mp4" codecs="avc1.42c01e" width="450" height="800"
bandwidth="269011" startWithSAP="1">
                    <BaseURL> full_video_lowres.mp4</BaseURL>
                    <SegmentBase indexRangeExact="true" indexRange="837-988"/>
                </Representation>
        </AdaptationSet>
        <AdaptationSet id="right" segmentAlignment="true" subsegmentAlignment="true"
subsegmentStartsWithSAP="1">
            <!-- Tiled panoramoa - video right part -->
            <SupplementalProperty schemeIdUri="urn:mpeg:dash:srd:2014" value="0,1,0,1,1,2,1"/>
            <SpatialPlaybackRegion id="2" width="70%" height="100%" top_left_x="30%" top_left_y="0%"/>
                <Representation mimeType="video/mp4" codecs="avc1.42c01e" width="450" height="800"
bandwidth="269011" startWithSAP="1">
                    <BaseURL> full_video_lowres.mp4</BaseURL>
                    <SegmentBase indexRangeExact="true" indexRange="837-988"/>
                </Representation>
        </AdaptationSet>
    </Period>
</MPD>
```

In an embodiment, when SRD elements (defining tiled media) are used in conjunction of the spatial playback information as described in this application, the coordinates and dimensions of the spatial playback regions are not various embodiments of the invention. The selection may be controlled by information associated with a user interacting with the video on the basis of user interface. This information may include the location (e.g. coordinates or information for determining coordinates) of a region of interest (ROI) selected by the user using a user interface (e.g. a GUI, a gesture-based UI or an optical pointing device). For example, the location information may e.g. include coordinates of a viewpoint of a user determined by sensors of a Head Mounted Display (HMD) worn by the user, coordinates of an eye gaze of a user determined by sensors of an HMD, coordinates of a region of interest generated by a user interacting with a user interface of mobile device (e.g. a touch sensitive screen or a gesture-based interface) or a pointing device. In another embodiment, instead of viewpoint, voice recognition may be used for selection by matching with the label parameter.

In an embodiment, viewpoint information may be obtained using an HMD or an equivalent thereof. In that case, position information of the viewpoint (which may be represented as a point on a sphere) or the viewport (which may be represented as a shaped area on a sphere) may be compared with position information of one or more spatial playback regions in the spherical video (which may be defined as a regions on the sphere). A client device may decide that a playback region is selected if the position of the viewpoint is within a playback region or if the position of the viewport at least partly overlaps with the region. Such a scheme may be implemented by obtaining the coordinates of the user's viewpoint or viewport and determining at which position the viewpoint or viewport is located on the spatial playback (SPR) map.

Figure 13A:
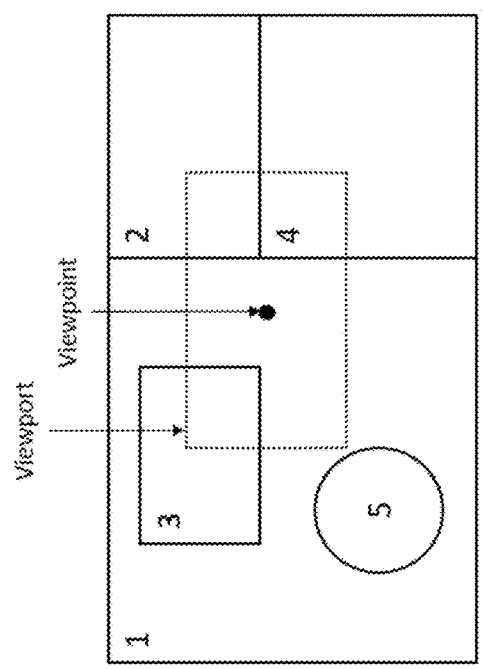
FIG. 13A illustrates the selection of an adaptation set using a spatial playback region according to various embodiments of the invention.

FIG. 13A illustrates an example of a spatial playback region selection scheme according to an embodiment of the invention. In this particular embodiment, a viewport of the user as determined by the video processing device, e.g. an HMD and the spatial playback regions may be used to select the next adaptation set. One or more sensors of the video processing device may determine the viewport on the basis of the orientation of the head of the user wherein the viewpoint is defined as the center of the viewport. The figure depicts a rectangular spatial playback region (SPR) map, wherein the outer boundaries may coincide with the boundaries of the video frames of the video (e.g. a panorama video or a 360 video). The SPR map may comprise a plurality of spatial playback regions, in this example five spatial playback regions 1-5, of different sizes and shapes. When the video is rendered by a video processing device of a user, only a part of the content of the video frames are rendered. This part may be referred to as the viewport of the user. A user may use the viewport to select an adaptation set that is linked to a particular spatial playback region. For example, in FIG. 13A the position of the viewpoint is located within spatial playback region 1 so that the client device will select the adaptation set that is linked to this region.

Figure 13B:
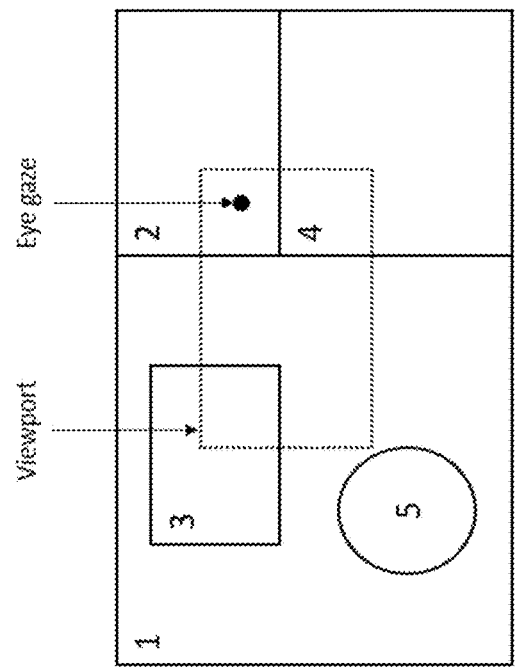
FIG. 13B is another illustration of the selection of an adaptation set using a spatial playback region according to various embodiments of the invention.

FIG. 13B illustrates an example of spatial playback region selection on the basis of eye-gaze detection sensor (which may be implemented in e.g. an HMD). By detecting eye gaze, the viewing direction of the user (the viewpoint) can be determined more accurate. In case of a HMD for example this would mean that the viewpoint is no longer necessarily in the center of the viewport (which is determined on the basis of the orientation of the head of the user, as described with reference to in FIG. 13A). FIG. 13B shows an example of a spatial playback region map comprising five spatial playback regions (similar to FIG. 13A), wherein the viewport and viewpoint are controlled on the basis of an eye-gaze detection sensor. In the example of FIG. 13B, the position of the viewpoint is located within spatial playback region 2 so that the client device will select the adaptation set that is linked to this region.

Figure 13C:
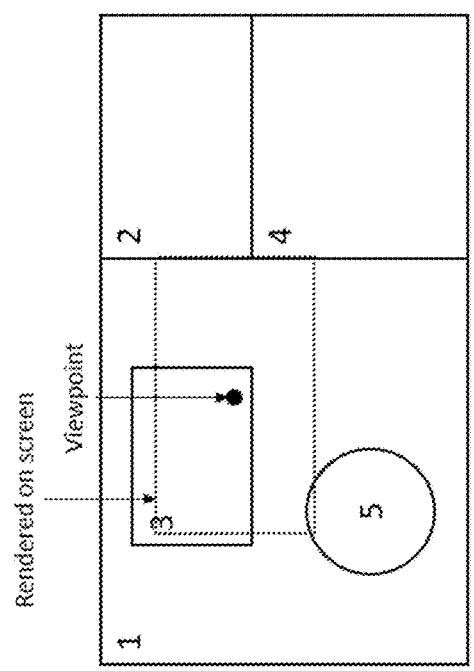
FIG. 13C is yet another illustration of the selection of an adaptation set using a spatial playback region according to various embodiments of the invention.

FIG. 13C illustrates an example of spatial playback region selection on the basis of a viewport rendered on a 2D screen of a mobile device. For example, the client device may render a region of interest (ROI) of the full scene defined by the video frames of a panorama video, wherein the spatial playback region information may define 5 spatial playback regions in the video frames of the panorama video. A user may interact with the rendered content on the basis of a user interface, e.g. a touch screen or a gesture-based user interface or the like. For example, a user may use panning and zooming actions to select a particular region of interest (ROI) of the scene for display. The center of the content that is rendered on the screen may define a viewpoint or a viewport and may be used by the client device to determine which region is selected. FIG. 13C depicts an example of a spatial playback region map including a viewpoint (black dot) and the region of the map that is rendered on screen (dotted line). The position of the viewpoint is located within spatial playback region 3 so that the client device may select the adaptation set that is linked to this region.

Figure 13D:
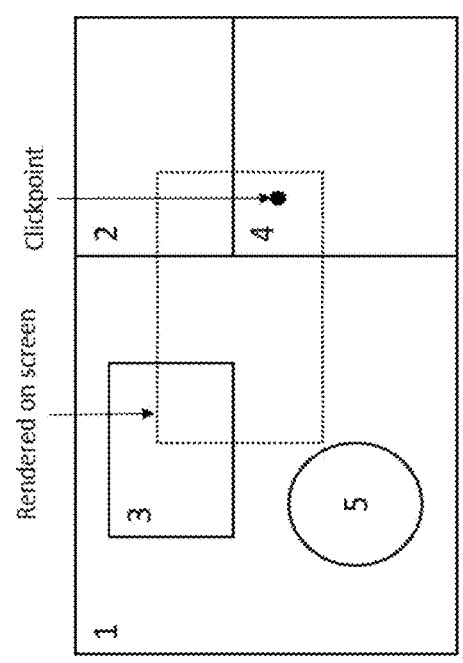
FIG. 13D is still another illustration of the selection of an adaptation set using a spatial playback region according to various embodiments of the invention.

FIG. 13D illustrates an example of spatial playback region selection on the basis of an active finger gesture by user. A user may determine a region of interest in the scene that is displayed to the user using a touch-sensitive screen or a gesture-type user interface. The user may select the region of interest by touching the screen or a predetermined gesture. FIG. 13D depicts an example of a spatial playback region map including the click point (black dot) and the region on the map that is rendered on screen (dotted line). The position of the click point (the point of the screen that was touched by the user) is located within spatial playback region 4 so that the client device may select the adaptation set that is linked to this region.

Figure 13E:
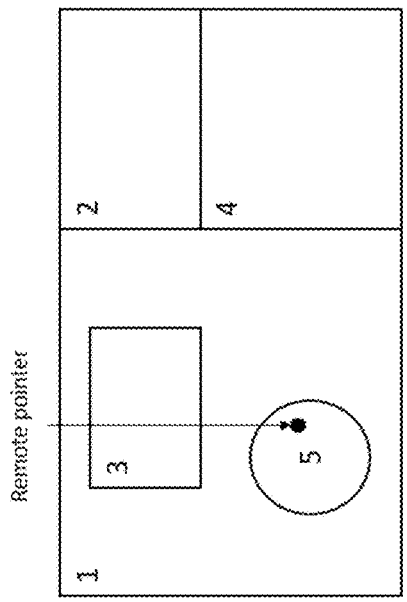
FIG. 13E is yet one more illustration of the selection of an adaptation set using a spatial playback region according to various embodiments of the invention.

FIG. 13E illustrates an example of spatial playback region selection on the basis of active pointing via input device. In this embodiment, a pointing device may be used to generate a viewpoint signal. For example, displays exists which allow a light source, e.g. laser, as a pointing device. FIG. 13E depicts an example of a spatial playback region map with the remote pointer (black dot). The position of the pointer is located within spatial playback region 5 so that the client device will select the adaptation set that is linked to this region.

While the spatial playback regions and the viewpoints in FIGS. 13A-13E are illustrated on the basis of a 2D coordinate system, other coordinates systems e.g. a 3D spherical coordinate system e.g. as described with reference to FIGS. 11 and 12) may also be used. A spherical coordinate system is especially appropriate when describing nonlinear playback of spherical video.

FIG. 13E may also illustrate an example of spatial playback region selection on the basis of a voice command application. In this scenario, each region may be linked a with predetermined voice commands using the "label" parameters as described with reference to table 2. A user would be presented with one or more options (either visually or by audio) and thereafter a user may select an option using a voice-controlled interface. For example, a user may speak his desired choice and the voice-controlled interface will match the user selection with the "label" parameter that is associated with each region. This can help people who are visually impaired and are for example hearing an audio track which presents options.

Figure 14:
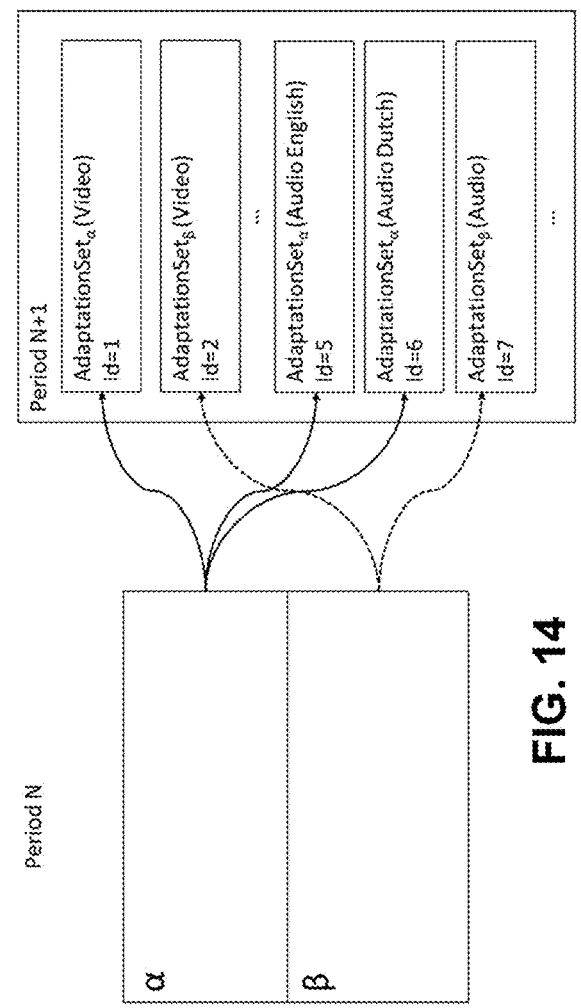
FIG. 14 illustrates a selection of an adaptation set on the basis spatial playback regions according to an embodiment of the invention.

FIG. 14 illustrates a selection of one or more adaptation sets from a plurality of adaptation sets according to an embodiment of the invention. In particular, FIG. 14 depicts an embodiment wherein a client device having chosen spatial playback region SPR$_\alpha$ is allowed to select Adaptation Sets 1, 5 and 6 and a client device having chosen spatial playback region SPR$_\beta$ is allowed to select adaptation sets 2 and 6. The spatial playback region selector of the client device may use the spatial playback information in an MPD and viewpoint information and/or other user input to select the next adaptation set. This subset selection of Adaptation Sets may precede over all other selection criteria, e.g. as defined in the DASH standard. For instance, the language selection may happen only inside the subset of adaptation set.

Figure 15:
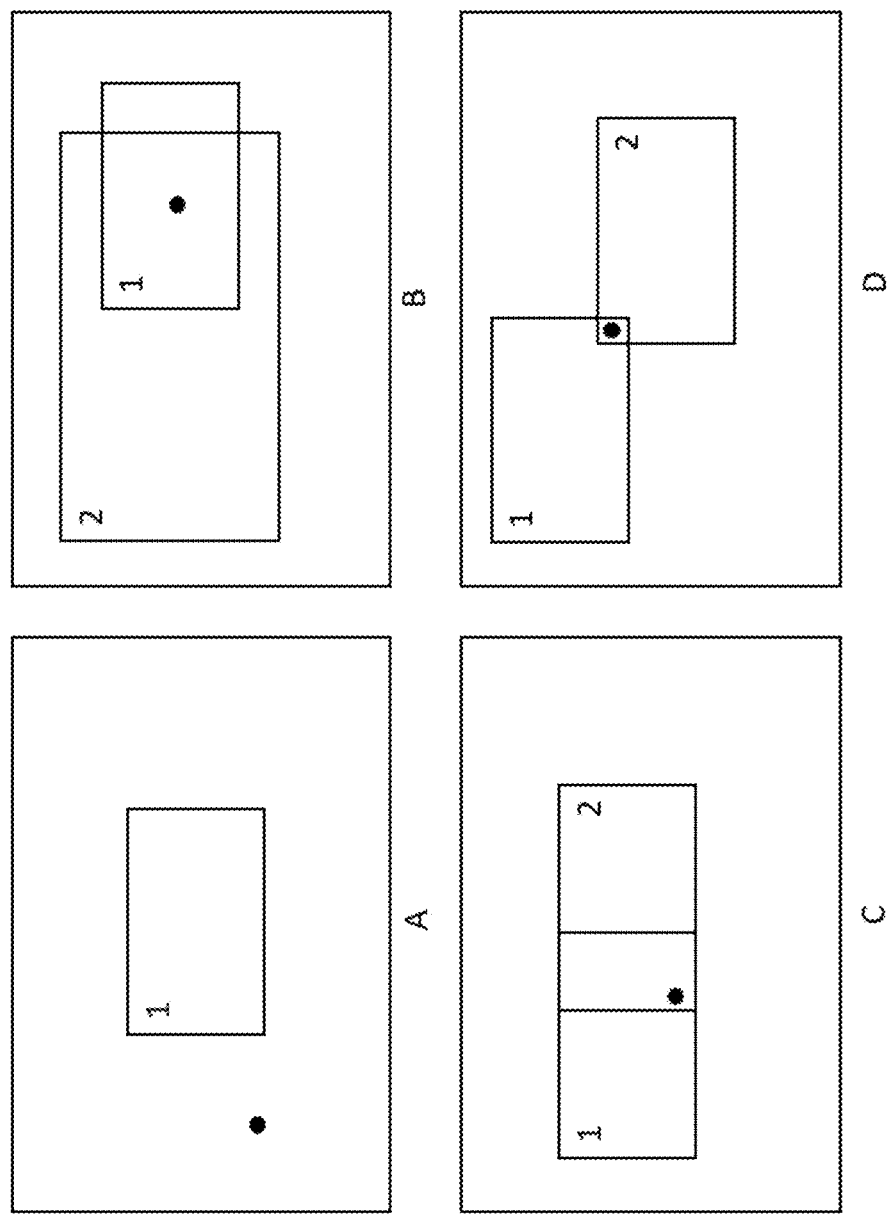
FIG. 15 shows spatial playback region selection scenarios that may arise in the various embodiments described in this application.

FIG. 15 panels A, B, C, and D show spatial playback region selection scenarios that may arise in the various embodiments described in this application. If—at the end of the playback of the current adaptation set—a user did not interact with any of the regions (e.g. did not looked at) as defined by the spatial playback region descriptors of a current adaptation set, the selection scheme on the basis of the spatial playback information as described in this disclosure will not be triggered. Such scenario may exist if the video pictures are not entirely partitioned in spatial playback regions. In that case, playback may be continued by the HAS client device as in a conventional HAS playback scenario. The HAS client device may parse the manifest file and select an adaptation set of the playback period according to the order the playback periods are listed in the manifest file and will continue playback without using the spatial playback information (as shown in panel A).

In the case that one spatial playback region is located within another playback region (or in case there is an overlap) it may be defined the smaller spatial playback region has priority over the larger one (as shown in panel B). In case, the two playback regions are of the same size, the distance from the viewpoint to the center of the each of the playback regions may be calculated. It may be defined that the playback region that is closest to the viewpoint may be selected (as shown in panel C). Alternatively or additionally (e.g. if the distance is the same), then the playback region that has the smallest id number may be selected (as shown in panel D). Hence, as shown in these figures, in case a user interacts with two or more playback regions, selection rules may be defined on the basis of the dimensions of the playback regions, the distance of (the centre of) the spatial playback regions and the viewpoint and/or other criteria, such as the id number of the spatial playback regions.

Figure 16:
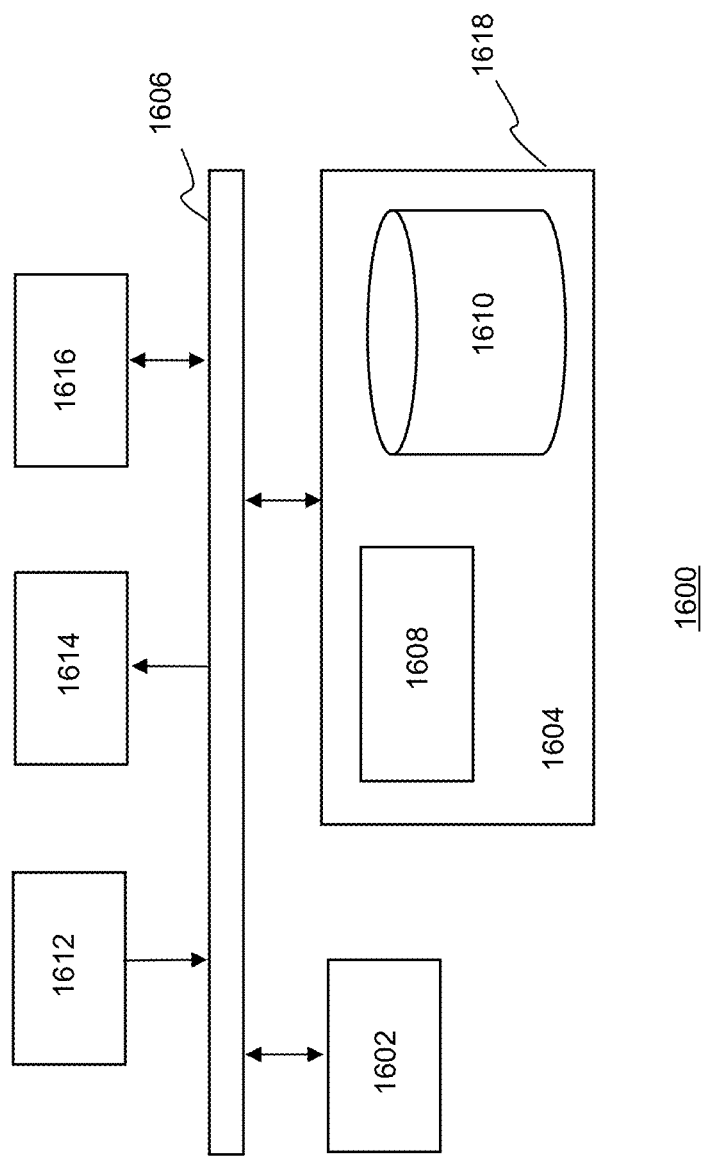
FIG. 16 is a block diagram illustrating an exemplary data computing system that may be used for executing methods and software products described in this disclosure.

FIG. 16 is a block diagram illustrating exemplary data processing systems described in this disclosure. Data processing system 1600 may include at least one processor 1602 coupled to memory elements 1604 through a system bus 1606. As such, the data processing system may store program code within memory elements 1604. Further, processor 1602 may execute the program code accessed from memory elements 1604 via system bus 1606. In one aspect, data processing system may be implemented as a computer that is suitable for storing and/or executing program code. It should be appreciated, however, that data processing system 1600 may be implemented in the form of any system including a processor and memory that is capable of performing the functions described within this specification.

Memory elements 1604 may include one or more physical memory devices such as, for example, local memory 1608 and one or more bulk storage devices 1610. Local memory may refer to random access memory or other non-persistent memory device(s) generally used during actual execution of the program code. A bulk storage device may be implemented as a hard drive or other persistent data storage device. The processing system 1800 may also include one or more cache memories (not shown) that provide temporary storage of at least some program code in order to reduce the number of times program code must be retrieved from bulk storage device 1610 during execution.

Input/output (I/O) devices depicted as input device 1612 and output device 1614 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1616 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data receiver and a data transmitter for transmitting data to said systems, devices and/or networks. Modems, cable modems, and Ethernet cards are examples of different types of network adapter that may be used with data processing system 1650.

As pictured in FIG. 16, memory elements 1604 may store an application 1618. It should be appreciated that data processing system 1600 may further execute an operating system (not shown) that can facilitate execution of the application. Application, being implemented in the form of executable program code, can be executed by data processing system 1600, e.g., by processor 1602. Responsive to executing application, data processing system may be configured to perform one or more operations to be described herein in further detail.

In one aspect, for example, data processing system 1600 may represent a client data processing system or in short a client device or a client apparatus as referred to in this application. In that case, application 1618 may represent a client application that, when executed, configures data processing system 1600 to perform the various functions described herein with reference to a "client". Examples of a client device or a client apparatus can include, but are not limited to, a personal computer, a portable computer, a mobile phone, a head mounted device, or the like.

In another aspect, data processing system may represent a server. For example, data processing system may represent an (HTTP) server, e.g. a network node as referred to in this application, in which case application 1618, when executed, may configure data processing system to perform (HTTP) server operations. In another aspect, data processing system may represent a module, client, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for adaptive streaming of nonlinear video comprising:
   a client apparatus receiving a first manifest file comprising metadata defining one or more playback periods, a playback period defining video data of a predetermined playback duration, a playback period including at least one adaptation set defining a plurality of representations, each representation defining a set of segment identifiers, each segment identifier identifying a segment comprising video data, the video data including a sequence of video frames;
   the metadata further comprising spatial playback information including at least a first region descriptor associated with a first adaptation set of a first playback period, the first region descriptor defining a destination identifier and a first region, the first region encompassed by video frames, the video frames belonging to the first adaptation set, the destination identifier signaling the client apparatus that the first region is linked to a second adaptation set, the second adaptation set being associated with a second region descriptor, the second region descriptor including a source identifier that matches the destination identifier;
   the client apparatus using the metadata to playback video data of the first adaptation set by requesting one or more network nodes to transmit segments of the first adaptation set, and by receiving, during playback of requested segments, information associated with at least a second region, the second region encompassed by the video frames of the first adaptation set, the second region defining a region of interest (ROI) of a user of the client apparatus; and
   the client apparatus selecting the second adaptation set for playback after the end of the playback of the first adaptation set on the basis of the first and second region, the selecting being based on a distance or an overlap between the first and second region.

2. The method according to claim 1, wherein the first region descriptor further comprises a period identifier, the period identifier signaling the client apparatus that the second adaptation set is defined in the metadata of a second playback period.

3. The method according to claim 1, wherein the first region descriptor further includes location information of the first region and information associated with dimensions and/or shape of the first region, the location information being coordinates of the first region in the video frames of the first adaptation set, or information to determine coordinates of the first region in the video frames of the first adaptation set.

4. The method according to claim 1, wherein the spatial playback information further includes a dynamic region parameter, the dynamic region parameter signaling the client apparatus that the location of the first region changes as a function of time, the coordinates associated with the location of the first region being stored as metadata of the video data of the first playback period.

5. The method according to claim 1, wherein the first adaptation set is associated with a plurality of region descriptors defining locations of a plurality of regions in the video frames of the first adaptation set, each of the region descriptors signaling the client apparatus that each of the plurality of regions is linked to a further adaptation set, and wherein the client apparatus selecting the second adaptation set comprises the selecting being based on the locations of the plurality of regions and the location of the ROI of the user of the client apparatus.

6. The method according claim 1, wherein the first manifest file further comprises metadata defining the second adaptation set and, the method further comprises:
   the client apparatus requesting one or more network nodes to transmit segments of the second adaptation set.

7. The method according to claim 1, wherein the spatial playback information further includes a manifest file reference identifier, the manifest file reference identifier including information defining a location of a network node, the manifest file reference identifier signaling the client apparatus to request the network node to transmit metadata of the second adaptation set to the client device, the manifest file reference identifier defining a MPD chaining element associated with the second adaptation set.

8. The method according to claim 7, further comprising:
   the client apparatus using the manifest file reference identifier to request a network node to transmit a second manifest file comprising metadata of the second adaptation set, the metadata including segment identifiers associated with the second adaptation set; and
   the client apparatus using the second manifest file to request a network node to transmit segments of the second adaptation set.

9. Method according claim 1, wherein the adaptive streaming is based on an HTTP adaptive streaming protocol, the protocol being one of: MPEG Dynamic Adaptive Streaming over HTTP (MPEG DASH), 3GPP DASH or MPEG Common Media Application Format (CMAF); and wherein a playback period is defined as a Period as defined in a MPEG DASH standard or as a CMAF Presentation as defined in the CMAF standard, a Period comprising one or more Adaptation Sets, wherein an Adaptation Set includes one or more Representations, a Representation including segments comprising video data of a predetermined video quality and CMAF Presentation comprising one or more CMAF Switching Sets, a CMAF Switching Set including one or more CMAF Tracks, a Track including CMAF fragments comprising video data of a predetermined video quality.

10. The method according to claim 7, further comprising:
   the client apparatus using the manifest file reference identifier to request a network node to transmit a second manifest file comprising metadata of the second adaptation set, the metadata including information for determining segment identifiers associated with the second adaptation set; and
   the client apparatus using the second manifest file to request a network node to transmit segments of the second adaptation set.

11. The method according to claim 1, wherein the spatial playback information further includes information for determining a manifest file reference identifier, the manifest file reference identifier including information defining a location of a network node, the manifest file reference identifier signaling the client apparatus to request the network node to transmit metadata of the second adaptation set to the client device, the manifest file reference identifier defining a MPD chaining element associated with the second adaptation set.

12. The method according to claim 11, further comprising:
the client apparatus using the manifest file reference identifier to request a network node to transmit a second manifest file comprising metadata of the second adaptation set, the metadata including segment identifiers associated with the second adaptation set; and
the client apparatus using the second manifest file to request a network node to transmit segments of the second adaptation set.

13. The method according to claim 11, further comprising:
the client apparatus using the manifest file reference identifier to request a network node to transmit a second manifest file comprising metadata of the second adaptation set, the metadata including information for determining segment identifiers associated with the second adaptation set; and
the client apparatus using the second manifest file to request a network node to transmit segments of the second adaptation set.

14. A client apparatus comprising:
a computer readable storage medium having computer readable program code embodied therewith, and a processor coupled to the computer readable storage medium, wherein responsive to executing the computer readable program code, the processor is configured to cause the client apparatus to perform executable operations comprising:
receiving a first manifest file comprising metadata defining one or more playback periods, a playback period defining video data of a predetermined playback duration, a playback period including at least one adaptation set defining a plurality of representations, each representation defining a set of segment identifiers, each segment identifier identifying a segment comprising video data, the video data including a sequence of video frames;
the metadata further comprising spatial playback information including at least a first region descriptor associated with a first adaptation set of a first playback period, the first region descriptor defining a destination identifier and a first region, the first region encompassed by video frames, the video frames belonging to the first adaptation set, the destination identifier signaling the client apparatus that the first region is linked to a second adaptation set, the second adaptation set being associated with a second region descriptor, the second region descriptor including a source identifier that matches the destination identifier;
using the metadata to playback video data of the first adaptation set by requesting one or more network nodes to transmit segments of the first adaptation set, and by receiving or determining, during playback of requested segments, at least a second region, the second region encompassed by the video frames of the first adaptation set, the second region defining a region of interest (ROI) of a user of the client apparatus; and
selecting the second adaptation set for playback after the end of the playback of the first adaptation set on the basis of the first and second region, the selecting being based on a distance or an overlap between the first and second region.

15. A non-transitory computer-readable storage medium having stored thereon computer-readable instructions that, when executed by a processor of a client apparatus, cause the client apparatus to carry out operations comprising:
receiving a first manifest file comprising metadata defining one or more playback periods, a playback period defining video data of a predetermined playback duration, a playback period including at least one adaptation set defining a plurality of representations, each representation defining a set of segment identifiers, each segment identifier identifying a segment comprising video data, the video data including a sequence of video frames;
the metadata further comprising spatial playback information including at least a first region descriptor associated with a first adaptation set of a first playback period, the first region descriptor defining a destination identifier and a first region, the first region encompassed by video frames, the video frames belonging to the first adaptation set, the destination identifier signaling the client apparatus that the first region is linked to a second adaptation set, the second adaptation set being associated with a second region descriptor, the second region descriptor including a source identifier that matches the destination identifier;
using the metadata to playback video data of the first adaptation set by requesting one or more network nodes to transmit segments of the first adaptation set, and by receiving or determining, during playback of requested segments, at least a second region, the second region encompassed by the video frames of the first adaptation set, the second region defining a region of interest (ROI) of a user of the client apparatus; and
selecting the second adaptation set for playback after the end of the playback of the first adaptation set on the basis of the first and second region, the selecting being based on a distance or an overlap between the first and second region.

16. The non-transitory computer-readable storage media according to claim 15, wherein the first region descriptor further comprises a period identifier, the period identifier signaling the client apparatus that the second adaptation set is defined in the metadata of a second playback period.

17. The non-transitory computer-readable storage media according to claim 15, wherein the first region descriptor further includes location information of the first region and information associated with dimensions and/or shape of the first region, the location information being coordinates of the first region in one or more video frames of the first adaptation set, or information to determine coordinates of the first region in one or more video frames of the first adaptation set.

18. The non-transitory computer-readable storage media according to claim 15, wherein the first adaptation set is associated with a plurality of region descriptors defining the locations of a plurality of regions in the video frames of the first adaptation set, the region descriptors signaling the client apparatus that each of the regions is linked to a further adaptation set, the client apparatus selecting the second adaptation set from the plurality of further adaptation sets on the basis of the locations of the regions and the location of the ROI.

19. The non-transitory computer-readable storage media according to claim 15, wherein the first manifest file further comprises metadata defining at least the second playback period.

20. The non-transitory computer-readable storage media according to claim 15, wherein the spatial playback information further includes a manifest file reference identifier, the manifest file reference identifier including information of a location of a network node, the manifest file reference identifier signaling the client apparatus to request the network node to transmit metadata of the second adaptation set to the client device, the manifest file reference identifier defining a MPD chaining element associated with the second adaptation set.

21. The non-transitory computer-readable storage media according to claim 15, wherein the spatial playback information further includes information for determining a manifest file reference identifier, the manifest file reference identifier including information of a location of a network node, the manifest file reference identifier signaling the client apparatus to request the network node to transmit metadata of the second adaptation set to the client device, the manifest file reference identifier defining a MPD chaining element associated with the second adaptation set.

* * * * *